United States Patent
Cheng

(10) Patent No.: US 10,618,734 B2
(45) Date of Patent: Apr. 14, 2020

(54) FULFILLMENT SYSTEM, AND SORTING METHODS AND APPARATUSES APPLIED TO THE FULFILLMENT SYSTEM

(71) Applicants: BEIJING JINGDONG SHANGKE INFORMATION TECHNOLOGY CO., LTD., Beijing (CN); JD.com AMERICAN TECHNOLOGIES CORPORATION, Santa Clara, CA (US)

(72) Inventor: Hui Cheng, Bridgewater, NJ (US)

(73) Assignees: Beijing Jingdong Shangke Information Technology Co., Ltd., Beijing (CN); JD.COM American Technologies Corporation, Santa Clara, CA (US)

( * ) Notice: Subject to any disclaimer, the term of this patent is extended or adjusted under 35 U.S.C. 154(b) by 0 days.

(21) Appl. No.: 15/941,680

(22) Filed: Mar. 30, 2018

(65) Prior Publication Data
US 2019/0300285 A1    Oct. 3, 2019

(51) Int. Cl.
*B65G 1/137*    (2006.01)
(52) U.S. Cl.
CPC ........ *B65G 1/1373* (2013.01); *B65G 2201/02* (2013.01)

(58) Field of Classification Search
CPC combination set(s) only.
See application file for complete search history.

(56) References Cited

U.S. PATENT DOCUMENTS

| | | | |
|---|---|---|---|
| 7,504,949 B1 * | 3/2009 | Rouaix | G06Q 10/06 340/572.1 |
| 10,192,195 B1 * | 1/2019 | Brazeau | G06Q 10/087 |
| 2015/0081088 A1 * | 3/2015 | Lyon | G06Q 10/0875 700/216 |

* cited by examiner

*Primary Examiner* — Kyle O Logan
(74) *Attorney, Agent, or Firm* — RatnerPrestia

(57) ABSTRACT

Embodiments of the present disclosure disclose a fulfillment system, sorting methods and sorting apparatuses applied to the fulfillment system. A preferred embodiment of the method comprises: sending by a control server, target transportation indication information corresponding to a target order to a target vehicle, wherein the target transportation indication information includes the target order and a target storage compartment identifier, the target, storage compartment identifier being configured for indicating a target storage compartment in a target storage receptacle connected with the target vehicle; and then collecting, by the target vehicle, an item/items corresponding to the target order to the target storage compartment in response to receiving the target transportation indication information, thereby collecting the item(s) corresponding to each order to a specific storage compartment, which need not an additional sorting step, thereby reducing fulfillment costs.

25 Claims, 5 Drawing Sheets

FULFILLMENT SYSTEM, AND SORTING METHODS AND APPARATUSES APPLIED TO THE FULFILLMENT SYSTEM

TECHNICAL FIELD

Embodiments of the present disclosure relate to the technical field of fulfillment, specifically to the technical field of sorting, and more particularly to a fulfillment system, and sorting methods and sorting apparatuses applied to the fulfillment system.

BACKGROUND

In a current fulfillment system, it is needed to first retrieve an item ordered by a customer from its storage position (e.g., on a shelf) and then put it in a bin or a cart. After all items in a same set of orders are retrieved from their storage positions, the bin or cart holding these items will be sent to a sorting station where the items in the bin or cart will be sorted based on individual customer orders and the sorted items may be packaged.

SUMMARY

Embodiments of the present disclosure provide a fulfillment system, and sorting methods and sorting apparatuses applied to the fulfillment system.

In a first aspect, an embodiment of the present disclosure provides a fulfillment system, comprising: a control server, at least one vehicle, and at least one storage receptacle connected with the vehicle, the storage receptacle including at least one storage compartment, wherein the control server is configured for sending target transportation indication information corresponding to a target order to a target vehicle, the target transportation indication information including the target order and a target storage compartment identifier, the target storage compartment identifier being configured for indicating a target storage compartment in a target storage receptacle connected with the target vehicle; and the target vehicle is configured for collecting an item/items corresponding to the target order to the target storage compartment in response to receiving the target transportation indication information.

In some embodiments, the fulfillment system further comprises a packaging station; and the target vehicle is further configured for traveling to a position of the packaging station in response to determining that at least one packaging condition in a group of preset packaging conditions is satisfied.

In some embodiments, the target vehicle is also configured for after traveling to the position of the packaging station, sending the target order to the packaging station, and sending the target storage compartment identifier to the packaging station or presenting the target storage compartment indication information, wherein the target storage compartment indication information is configured for indicating whether each storage compartment in the target receptacle is the target storage compartment; and the packaging station is configured for packaging the item/items in the target storage compartment according to the target order.

In some embodiments, the fulfillment system further comprises a storage receptacle holding area; and the target vehicle is further configured for after sending the target storage compartment identifier to the packaging station, disconnecting with the target storage receptacle, traveling to the storage receptacle holding area, and connecting with a storage receptacle held in the storage receptacle holding area.

In some embodiments, the target vehicle is configured for in response to receiving the target transportation indication information, for each of the items corresponding to the target order, traveling to a position of the item, and collecting the item to the target storage compartment.

In some embodiments, the fulfillment system further comprises at least one retrieval information receiving device; and the target vehicle is configured for presenting retrieval information corresponding to the item, which retrieval information includes an item identifier and an item quantity, or sending the retrieval information corresponding to the item, to the retrieval information receiving device of a picker corresponding to the position of the item, wherein the picker corresponding to the position of the item is configured for retrieving the item according to the retrieval information corresponding to the item and putting the item into the target storage compartment.

In some embodiments, the at least one retrieval information receiving device includes a handheld device and/or a robot picker.

In some embodiments, the target vehicle is further configured for after traveling to the position of the item and before collecting the item to the target storage compartment, sending the target storage compartment identifier to the retrieval information receiving device of the picker corresponding to the position of the item or presenting the target storage compartment indication information.

In some embodiments, each storage compartment in the target storage receptacle is provided in association with an indicator light and/or a door, and the target vehicle is electrically connected with the target storage receptacle; and the target vehicle is configured for controlling to set the indicator light provided in association with the target storage compartment to a state that indicate the storage compartment is the target storage compartment, and controlling to set the indicator light(s) provided in association with other storage compartment(s) than the target storage compartment to a state that indicate the other storage compartment(s) are not the target storage compartment; and/or the target vehicle is configured for controlling to open the door of the target storage compartment.

In some embodiments, the packaging station further comprises a robot arm and a packaging platform; and the robot arm is configured for retrieving the item/items in the target storage compartment and moving the item/items retrieved from the target storage compartment to the packaging platform.

In some embodiments, a slope is provided at an inner side bottom portion of the each storage compartment in the target storage receptacle, a first door is provided at an outer side of the each storage compartment corresponding to a bottom portion of the slope, and a second door and/or the indicator light is provided at a side corresponding to a top portion of the slope.

In some embodiments, the target vehicle is configured for after traveling to the position of the item and before collecting the item to the target storage compartment, controlling to open the second door of the target storage compartment and/or controlling to set the indicator light provided in association with the target storage compartment to a state that indicate the storage compartment is the target storage compartment; and controlling to set the indicator light(s) provided in association with other storage compartment(s) than the target storage compartment in the target storage receptacle to a state that indicate the other storage compartment(s) are not the target storage compartment.

In some embodiments, the packaging station further comprises a packaging platform; and the target vehicle is configured for after sending the target order to the packaging station, controlling to open the first door of the target storage compartment such that the item in the target storage compartment slides off onto the packaging platform.

In a second aspect, an embodiment of the present disclosure provides a sorting method applied to a control server in a fulfillment system, wherein the fulfillment system comprises: a control server, at least one vehicle, and at least one storage receptacle connected with the vehicle, the storage receptacle including at least one storage compartment, the method comprising: sending target transportation indication information corresponding to a target order to a target vehicle in the at least one vehicle, wherein the target transportation indication information includes the target order and a target storage compartment identifier, the target storage compartment identifier being configured for indicating a target storage compartment in a target storage receptacle connected with the target vehicle; and wherein the target vehicle collects an item/items corresponding to the target order to the target storage compartment in response to receiving the target transportation indication information.

In a third aspect, an embodiment of the present disclosure provides a sorting method applied to a vehicle in a fulfillment system, wherein the fulfillment system comprises: a control server, at least one vehicle, and at least one storage receptacle connected with the vehicle, the storage receptacle including at least one storage compartment, the method comprising: collecting an item/items corresponding to a target order to a target storage compartment in response to receiving target transportation indication information sent from the control server, wherein the target transportation indication information includes the target order and a target storage compartment identifier, the target storage compartment identifier being configured for indicating the target storage compartment in a target storage receptacle connected with the vehicle.

In some embodiments, the fulfillment system further comprises a packaging station; and the method further comprises: traveling to a position of the packaging station in response to determining that at least one packaging condition in a group of preset packaging conditions is satisfied.

In some embodiments, after traveling to the position of the packaging station, the method further comprises: sending the target order to the packaging station, and sending the target storage compartment identifier to the packaging station or presenting the target storage compartment indication information, wherein the target storage compartment indication information is configured for indicating whether each storage compartment in the target receptacle is the target storage compartment; and wherein the packaging station packages the item/items in the target storage compartment according to the target order.

In some embodiments, the fulfillment system further comprises a storage receptacle holding area; and after sending the target storage compartment identifier to the packaging station, the method further comprises: disconnecting with the target storage receptacle, traveling to the storage receptacle holding area, and connecting with a storage receptacle held in the storage receptacle holding area.

In some embodiments, collecting an item/items corresponding to a target order to a target storage compartment response to receiving target transportation indication information sent from the control server comprises: in response to receiving the target transportation indication information sent from the control server, for each of the items corresponding to the target order, traveling to a position of the item, and collecting the item to the target storage compartment.

In some embodiments, the fulfillment system further comprises at least one retrieval information receiving device; and collecting the item to the target storage compartment comprises: presenting retrieval information corresponding to the item, which retrieval information includes an item identifier and an item quantity, or sending the retrieval information corresponding to the item, to the retrieval information receiving device of a picker corresponding to the position of the item, wherein the picker corresponding to the position of the item picks the item according to the retrieval information corresponding to the item and puts the item into the target storage compartment.

In some embodiments, the at least one retrieval information receiving device includes a handheld device and/or a robot picker.

In some embodiments, after traveling to the position of the item and before collecting the item to the target storage compartment, the method further comprising: sending the target storage compartment identifier to the retrieval information receiving device of the picker corresponding to the position of the item or presenting the target storage compartment indication information.

In some embodiments, each storage compartment in the target storage receptacle is provided in association with an indicator light and/or a door, and the target vehicle is electrically connected with the target storage receptacle; and presenting the target storage compartment indication information comprises: controlling to set the indicator light provided in association with the target storage compartment to a state that indicate the storage compartment is the target storage compartment, and controlling to set the indicator light(s) provided in association with other storage compartment(s) than the target storage compartment to a state that indicate the other storage compartment(s) are not the target storage compartment; and/or controlling to open the door of the target storage compartment.

In some embodiments, the packaging station further comprises a robot arm and a packaging platform; and the packaging station packaging the item/items in the target storage compartment according to the target order comprises: the robot arm retrieving the item/items in the target storage compartment and moving the item/items retrieved from the target storage compartment to the packaging platform.

In some embodiments, a slope is provided at an inner side bottom portion of the each storage compartment in the target storage receptacle, a first door is provided at an outer side of the each storage compartment corresponding to a bottom portion of the slope, and a second door and/or the indicator light is provided at a side corresponding to a top portion of the slope.

In some embodiments, after traveling to the position of the item and before collecting the item to the target storage compartment, presenting the target storage compartment indication information comprises: controlling to open the second door of the target storage compartment and/or controlling to set the indicator light provided in association with the target storage compartment to a state that indicate the storage compartment is the target storage compartment; and controlling to set the indicator light(s) provided in association with other storage compartment(s) than the target storage compartment in the target storage receptacle to a state that indicate the other storage compartment(s) are not the target storage compartment.

In some embodiments, the packaging station further comprises a packaging platform; and presenting the target storage compartment indication information after sending the target order to the packaging station comprises: controlling to open the first door of the target storage compartment such that the item in the target storage compartment slides off onto the packaging platform.

In a fourth aspect, an embodiment of the present disclosure provides a sorting apparatus applied to a control a fulfillment system, wherein, the fulfillment system comprises: a control server, at least one vehicle, and at least one storage receptacle connected with the vehicle, the storage receptacle including at least one storage compartment, the apparatus comprising: a sending unit configured for sending target transportation indication information corresponding to a target order to a target vehicle in the at least one vehicle, wherein the target transportation indication information includes the target order and a target storage compartment identifier, the target storage compartment identifier being configured for indicating a target storage compartment in a target storage receptacle connected with the target vehicle; and wherein the target vehicle collects an item/items corresponding to the target order to the target storage compartment in response to receiving the target transportation indication information.

In a fifth aspect, an embodiment of the present disclosure provides a sorting apparatus applied to a vehicle in a fulfillment system, wherein the fulfillment system comprises: a control server, at least one vehicle, and at least one storage receptacle connected with the vehicle, the storage receptacle including at least one storage compartment, the apparatus comprising: a collecting unit configured for collecting an item/items corresponding to a target order to a target storage compartment in response to receiving target transportation indication information sent from the control server, wherein the target transportation indication information includes the target order and a target storage compartment identifier, the target storage compartment identifier being configured for indicating the target storage compartment in a target storage receptacle connected with the vehicle.

In some embodiments, the fulfillment system further comprises a packaging station; and the apparatus further comprises: a traveling unit configured for traveling to a position of the packaging station in response to determining that at least one packaging condition in a group of preset packaging conditions is satisfied.

In some embodiments, the apparatus further comprises: a sending or presenting unit configured for after traveling to the position of the packaging station, sending the target order to the packaging station, and sending the target storage compartment identifier to the packaging station or presenting the target storage compartment indication information, wherein the target storage compartment indication information is configured for indicating whether each storage compartment in the target receptacle is the target storage compartment; and wherein the packaging station packages the item/items in the target storage compartment according to the target order.

In some embodiments, the fulfillment system further comprises a storage receptacle holding area; and the apparatus further comprises: a disconnecting and connecting unit configured for after sending the target storage compartment identifier to the packaging station, disconnecting with the target storage receptacle, traveling to the storage receptacle holding area, and connecting with a storage receptacle held in the storage receptacle holding area.

In some embodiments, the collecting unit is further configured for in response to receiving the target transportation indication information sent from the control server, for each of the items corresponding to the target order, traveling to a position of the item, and collecting the item to the target storage compartment.

In some embodiments, the fulfillment system further comprises at least one retrieval information receiving device; and the collecting unit is further configured for presenting retrieval information corresponding to the item, which retrieval information includes an item identifier and an item quantity, or sending the retrieval information corresponding to the item, to the retrieval information receiving device of a picker corresponding to the position of the item, wherein the picker corresponding to the position of the item picks the item according to the retrieval information corresponding to the item and puts the item into the target storage compartment.

In some embodiments, the at least one retrieval information receiving device includes a handheld device and/or a robot picker.

In some embodiments, the collecting unit is further configured for after traveling to the position of the item and before collecting the item to the target storage compartment, sending the target storage compartment identifier to the retrieval information receiving device of the picker corresponding to the position of the item or presenting the target storage compartment indication information.

In some embodiments, each storage compartment in the target storage receptacle is provided in association with an indicator light and/or a door, and the target vehicle is electrically connected with the target storage receptacle; and presenting the target storage compartment indication information comprises: controlling to set the indicator light provided in association with the target storage compartment to a state that indicate the storage compartment is the target storage compartment, and controlling to set the indicator light(s) provided in association with other storage compartment(s) than the target storage compartment to a state that indicate the other storage compartment(s) are not the target storage compartment; and/or controlling to open the door of the target storage compartment.

In some embodiments, the packaging station further comprises a robot arm and a packaging platform; and the package station packages the item/items in the target storage compartment according to the target order comprises: the robot arm retrieving the item/items in the target storage compartment and moving the item/items retrieved from the target storage compartment to the packaging platform.

In some embodiments, a slope is provided at an inner side bottom portion of the each storage compartment in the target storage receptacle, a first door is provided at an outer side of the each storage compartment corresponding to a bottom portion of the slope, and a second door and/or the indicator light is provided at a side corresponding to a top portion of the slope.

In some embodiments, the collecting unit is further configured for controlling to open the second door of the target storage compartment and/or controlling to set the indicator light provided in association with the target storage compartment to a state that indicate the storage compartment is the target storage compartment; and controlling to set the indicator light(s) provided in association with other storage compartment(s) than the target storage compartment in the target storage receptacle to a state that indicate other storage compartment(s) are not the target storage compartment.

In some embodiments, the packaging station further comprises a packaging platform; and the sending or presenting unit is further configured for after sending the target order to the packaging station, controlling to open the first door of the target storage compartment such that the item in the target storage compartment slides off onto the packaging platform.

In a sixth aspect, an embodiment of the present disclosure provides a control server, the control server comprising: an interface; a memory on which a computer program is stored; and one or more processors operably coupled to the interface and the memory, wherein the one or more processors function to: send target transportation indication information corresponding to a target order to a target vehicle in the at least one vehicle, wherein the target transportation indication information includes the target order and a target storage compartment identifier, the target storage compartment identifier being configured for indicating a target storage compartment in a target storage receptacle connected with the target vehicle; and wherein the target vehicle collects an item/items corresponding to the target order to the target storage compartment in response to receiving the target transportation indication information.

In a seventh aspect, an embodiment of the present disclosure provides a computer-readable storage medium on which a computer program is stored, wherein the computer program, when being executed by or more processors, cause the one or more processors to: send target transportation indication information corresponding to a target order to a target vehicle in the at least one vehicle, wherein the target transportation indication information includes the target order and a target storage compartment identifier, the target storage compartment identifier being configured for indicating a target storage compartment in a target storage receptacle connected with the target vehicle and wherein the target vehicle collects an item/items corresponding to the target order to the target storage compartment in response to receiving the target transportation indication information.

In an eighth aspect, an embodiment of the present disclosure provides a vehicle, comprising: a moving apparatus; a carrying apparatus; and a control apparatus operably coupled to the moving apparatus, wherein the control apparatus comprises an interface, a memory on which a computer program is stored, and one or more processors operably coupled to the interface and the memory, wherein the one or more processors function to: collect an item/items corresponding to a target order to a target storage compartment in response to receiving target transportation indication information sent from the control server, wherein the target transportation indication information includes the target order and a target storage compartment identifier, the target storage compartment identifier being configured for indicating the target storage compartment in a target storage receptacle connected with the vehicle.

In a ninth aspect, an embodiment of the present disclosure provides a computer-readable storage medium on which a computer program is stored, wherein the computer program, when being executed by or more processors, cause the one or more processors to: collect an item/items corresponding to a target order to a target storage compartment in response to receiving target transportation indication information sent from the control server, wherein the target transportation indication information includes the target order and a target storage compartment identifier, the target storage compart-ment identifier being configured for indicating the target storage compartment in a target storage receptacle connected with the vehicle.

The fulfillment system, and the sorting methods and apparatuses applied to the fulfillment system provided by the embodiments of the present disclosure do not need an additional storing step and thereby reduce fulfillment costs through sending, by the control server, target transportation indication information corresponding to a target order to a target vehicle, wherein the target transportation indication information includes the target order and a target storage compartment identifier, and the target storage compartment identifier is configured for indicating a target storage compartment in a target storage receptacle connected with the target vehicle; and then collecting, by the target vehicle, an item/items corresponding to the target order to the target storage compartment in response to receiving the target transportation indication information, thereby collecting the item/items corresponding to each order into the storage compartment corresponding to the order.

BRIEF DESCRIPTION OF THE DRAWINGS

Other features, objectives and advantages of the present disclosure will become more apparent through reading the detailed description of non-limiting embodiments with reference to the accompanying drawings.

DETAILED DESCRIPTION OF THE PREFERRED EMBODIMENTS

Hereinafter, the present disclosure will be described in further detail with reference to the accompanying drawings and the embodiments. It will be appreciated that the embodiments described herein are only for illustration, rather than limiting the present disclosure. In addition, it should also be noted that for the ease of description, the drawings only illustrate those parts related to the present disclosure.

It needs to be noted that without conflicts, the embodiments in the present disclosure and the features in the embodiments may be combined with each other. Hereinafter, the present disclosure will be illustrated in detail with reference to the accompanying drawings in conjunction with the embodiments.

Figure 1:
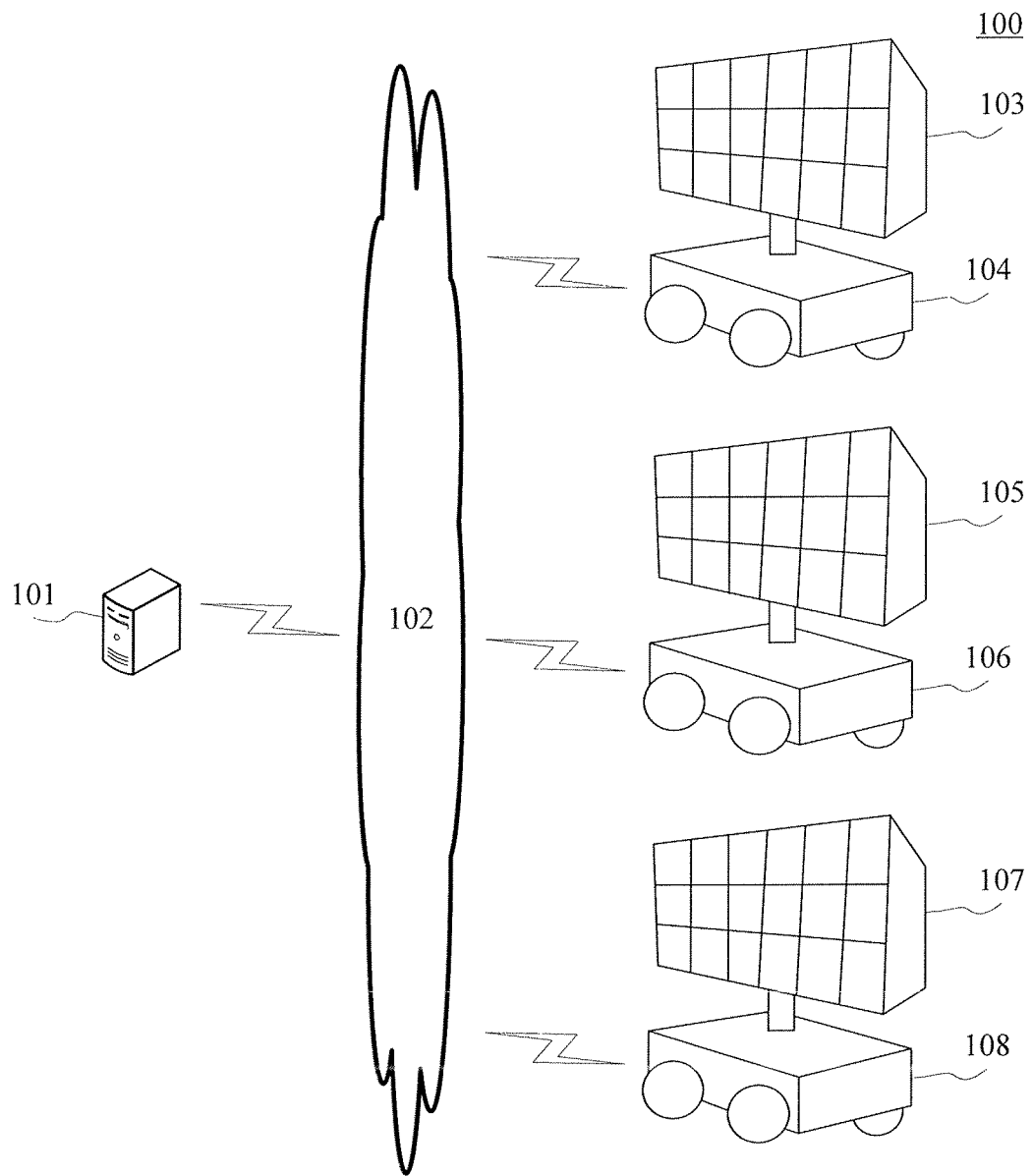
FIG. 1 is an exemplary system architecture diagram of a fulfillment system according to the present disclosure.

FIG. 1 illustrates an exemplary architecture diagram of a fulfillment system according to the present disclosure.

As illustrated in FIG. 1, the fulfillment system 100 may comprise a control server 101, a network 102, and vehicles 104, 106 and 108 and storage receptacles 103, 105, and 107, wherein the vehicle 104 is connected with the storage receptacle 103, the vehicle 106 is connected with the storage receptacle 105, and the vehicle 108 is connected with the storage receptacle 107.

The network 102 is a medium for providing a communication link between the control server 101 and the vehicles 104, 106, and 108. The network 102 may include various kinds of connection types, e.g., a wired communication link, a wireless communication link, or an optical cable, etc.

Various kinds of client applications may be installed on the control server 101, e.g., a WMS (Warehouse Management System), and etc.

The vehicles 104, 106, and 108 may be vehicles which can travel automatically and carry things.

The vehicles 104, 106 and 108 may be equipped with a control apparatus, a moving apparatus and a carrying apparatus.

The control apparatus controls the actions and the action parameters of the vehicles 104, 106, and 108. For example, moving forward, moving backward, moving direction, moving angle, or moving speed, etc. The control apparatus can also control the operations related to the storage compartments in the storage receptacle connected to the vehicles 104, 106, and 108. For example, when the storage compartment is provided in association with a door, it can control the operation of the door in association with the storage compartment, and for another example, when the storage compartment is provided in association with an indicator light, it can control the color of the indicator light in association with the storage compartment.

The control apparatus may compromise an interface (for example, input/output interface), a memory and one or more processors operably coupled to the interface and the memory. The control apparatus may be installed with various kinds of client applications, such as navigation applications, path planning applications, guidance applications, storage compartment control applications, and etc.

The moving apparatus may provide moving function for the vehicles 104, 106, and 108. The moving apparatus may be wheels, walking moving apparatuses (for example, one-legged moving apparatuses two-legged moving apparatuses and multi-legged moving apparatuses), crawling moving apparatuses, and other moving apparatuses that are now known or will be developed in the future.

The carrying apparatus may provide load-carrying function for the vehicles 104, 106, and 108. For example, the load apparatus may be a flat plate with various shapes (such as rectangles) and a flat plate with guardrail (for example, a flat plate equipped with four sides of guardrails).

It is understandable that the vehicles 104, 106 and 108 may also comprise power apparatus, and power apparatus can provide power for all kinds of operations of the vehicles 104, 106 and 108. For example, it can provide power for the control apparatus, the moving apparatus, the carrying apparatus, opening/closing the door provided in association with the storage compartment in the storage receptacle connected with the vehicles 104, 106 and 108, or turning on the indicator light provided in association with the storage compartment in the storage receptacle connected with the vehicles 104, 106 and 108. Here, the power device can include electric power (for example, storage battery), magnetic levitation, etc.

Alternatively, the vehicles 104, 106, and 108 may also be provided with an automatic guidance device such as electromagnetic or optical. In this way, the vehicles 104, 106, and 108 may travel along the prescribed guidance path. For example, the vehicles 104, 106, and 108 may be a variety of AGV (Automated Guided Vehicle).

The control server 101 may interact with the vehicles 104, 106, and 108 via the network 102. For example, the control server 101 may send a message to the vehicles 104, 106, and 108 via the network 102 so as to implement scheduling and controlling of the vehicles, while a vehicle may also send a message to the control server 101 via the network 102 so as to report its own position to the control server 101.

It needs to be noted that the vehicle and the storage receptacle may be an inseparable entirety (e.g., as shown in FIG. 1, the storage receptacle may be disposed on the vehicle, such that the vehicle may carry the storage receptacle to move together); the vehicle and the storage receptacle may be two parts that are separate but connected together (e.g., the storage receptacle may be provided with wheels at its bottom part such that the vehicle may be connected with the storage receptacle to drag it to move together). Here, the vehicle may be connected with the storage receptacle via a hook, a magnet, or a rope etc. When the vehicle and the storage receptacle are an inseparable entirety, the number of vehicles and the number of storage receptacles in the fulfillment system 100 may be identical. When the vehicle and the storage receptacle are separable two parts, the number of vehicles in the fulfillment may be less than or equal to the number of storage receptacles.

Each of the storage receptacles 103, 105 and 107 may include at least one storage compartment. A partition is provided between two neighboring storage compartments in a same storage receptacle to partition the two storage compartments. Each storage compartment is arranged for holding an item/items. Here, specific shapes of the storage receptacle and the storage compartment are not specifically limited. For example, the storage receptacle may include M-row and N-column of storage compartments, where M and N are both positive integers; each storage compartment may be a cuboid; and each storage compartment may be provided with a door or without a door.

It should be understood that, the numbers of the control server, the network, the vehicle, and the storage receptacle in FIG. 1 are only schematic, which may be provided in any number according to implementation needs.

In this embodiment, the control server may be configured for sending target transportation indication information corresponding to a target order to a target vehicle.

In this embodiment, the target order may be any specific order in a set of to-be-processed orders in the control server. Here, the illustration is only made with the target order as an example. It may be understood that the control server may be configured for sending, with each order in the set of to-be-processed orders as the target order, the target transportation indication information corresponding to the determined target order to the target vehicle corresponding to the target order.

In this embodiment, the order may be information generated from ordering a product by a user. The order may include recipient information and at least one item order information, wherein the recipient information refers to basic information about the recipient. For example, the recipient information may include: name of the recipient, address of the recipient, and telephone number of the recipient, while the item order information may include: an item identifier and an ordered item quantity, wherein the item identifier is configured for uniquely identifying each item in a set of preset items.

In this embodiment the target vehicle is a vehicle in the at least one vehicles in the fulfillment system for collecting respective item(s) corresponding to the target order. In practice, the control server may adopt various implementation manners to determine a certain vehicle in the at least one vehicles in the fulfillment system as the target vehicle. The methods of determining the target vehicle corresponding to the target order are prior arts that are currently widely studied and applied, which are thus not detailed here. For example, the control server may determine the target vehicle corresponding to the target order based on a current state (e.g., a working state or an idle state) of each vehicle in the fulfillment system, basic information of a storage receptacle connected with the vehicle (the number of storage compartments in the storage receptacle, and a volume of each storage compartment), a current storage state (e.g., the volume of the currently held item(s) in each storage compartment), and size information of the item(s) involved in the target order.

In this embodiment, the target transportation indication information may include the target order and a target storage compartment identifier, the target storage compartment identifier being configured for indicating a target storage compartment in a target storage receptacle connected with the target vehicle. Here, the target storage compartment refers to a storage compartment, in the target storage receptacle determined by the control server, for holding respective item(s) corresponding to the target order. It needs to be noted that the target storage compartment may be at least one target storage compartment; correspondingly, the target storage compartment identifier may also be at least one target storage compartment identifier. In practice, the control server may adopt various implementation manners to determine at least one storage compartment in the target storage receptacle as the target storage compartment. The methods of determining a target storage compartment in the target storage receptacle for holding the item(s) corresponding to the target order are prior arts currently widely studied and applied, which are not detailed here. For example, the control server may determine the target storage compartment based on current holding capacity information of respective storage compartments in the target storage receptacle and size information of the item(s) involved in the target order.

After determining the target vehicle and the target storage compartment, the control server may send the target transportation indication information corresponding to the target order to the target vehicle.

In this embodiment, the target vehicle may be configured for collecting an item/items corresponding to the target order to the target storage compartment in response to receiving the target transportation indication information.

In this embodiment, because the target vehicle has received the target transportation indication information, while the target transportation indication information includes the target order and the target storage compartment identifier, for each item order information in the target order, the target vehicle may collect the item(s) held in the fulfillment system identified by the item identifier in the item order information and with the number of the ordered item quantity in the item order information to the target storage compartment. In this way, the target vehicle may collect the item(s) corresponding to the target order to the target storage compartment according to the target order.

It needs to be noted that the control server may be used for multiple times to send, with a certain order in the set of to-be-processed orders as the target order, the target transportation indication information corresponding to the determined target order to the target vehicle, and the target vehicle may be used for multiple times to collect the item/items corresponding to the target order to the target storage compartment response to receiving the target transportation indication information. The target vehicle determined by the control server in each time may be a same vehicle in the at least one vehicle in the fulfillment system, or a different vehicle, while a certain specific vehicle in the at least one vehicle may receive a plurality of different target transportation indication information. To sum up, the control server in the fulfillment system records the target vehicle and target storage compartment corresponding to each order; moreover, each target vehicle also records each target order received by the target vehicle and the corresponding target storage compartment; therefore, an additional sorting step according to orders will not be needed, which further reduces fulfillment costs.

In some optional implementation manners of this embodiment, the fulfillment system may also comprise a packaging station. As such, the target vehicle may be further configured for traveling to a position of the packaging station in response to determining that at least one packaging condition in a group of preset packaging conditions is satisfied. Here, the packaging station may implement packaging of an item/items. For example, at the packaging station, an item/items may be manually packaged or automatically packaged (e.g., packaging with an automatic packaging machine).

As an example, the group of preset packaging conditions include at least one of the following conditions:

1. The number of available storage compartments in the target storage receptacle is less than a first preset number. For example, the number of available storage compartments in the target storage receptacle is less than 1, i.e., all storage compartments in the target storage receptacle have items stored, and there is already no available storage compartment in the target storage receptacle.

2. A space utilization of the target storage receptacle is larger than a preset utilization threshold. Here, the space utilization of the target storage receptacle may be a ratio between a volume of items held in the target storage receptacle and a sum of the volumes of each storage compartment of the target storage receptacle.

3. The number of transportation indication information received by the target vehicle is larger than or equal to a second preset number. For example, supposing that each storage compartment is for holding the item(s) corresponding to one order, the second preset number may be the number of storage compartments in the target storage receptacle.

4. The target vehicle receives a suspend instruction that controls the argot vehicle to suspend transportation.

In some optional implementation manners of this embodiment, the target vehicle may also be configured for after traveling to the position of the packaging station, sending the target order to the packaging station, and sending the target storage compartment identifier to the packaging station or presenting the target storage compartment indication information, wherein the target storage compartment indication information is configured for indicating whether each storage compartment in the target receptacle is the target storage compartment, while the packaging station may be configured for packaging the item(s) in the target storage compartment according to the received target order. Here, the target vehicle sends the target order to the packaging station; then the packaging station may generate recipient information based on the recipient information in the target order, and the packaging station may also determine what kind of materials (e.g., carton, plastic bag, adhesive tape, packaging tape, etc.) are needed to pack the item(s) corresponding to the target order, how many materials are used to package, as well as a specific packaging manner (e.g., sealing by adhesive tape, vertically bundling, and laterally bundling), based on the item order information in the target order. Specifically, if the target vehicle sends the target storage compartment identifier to the packaging station, the packaging station may determine the target storage compartment for holding the item(s) to package based on the received target storage compartment identifier, thereby packaging the item(s) in the target storage compartment. If the target vehicle presents the target storage compartment indication information, the packaging station may obtain the target storage compartment indication information, and get to know which one(s) are the target storage compartment in the target storage receptacle, and which are not based on the obtained target storage compartment indication information, and package the item(s) in the target storage compartment. As an example, the target vehicle may be provided with a display; in this way, the target vehicle may present the target storage compartment indication information on the provided display. It needs to be noted that the target order and the target storage compartment identifier/target storage compartment indication information here may be a plurality of target orders and corresponding target storage compartment identifiers/target storage compartment indication information, i.e., they may be target orders and target storage compartment identifiers/target storage compartment indication information corresponding to respective target transportation indication information received by the target vehicle before determining whether at least one packaging condition in a group of preset packaging conditions is satisfied. In this way, the target vehicle may be configured for sending, for each target transportation indication information in the plurality of target transportation indication information, the target order in the transportation indication information to the packaging station, and sending the target storage compartment identifier in the transportation indication information to the packaging station, or presenting the target storage compartment indication information corresponding to the target storage compartment identifier in the transportation indication information. As a result, the packaging station may be configured for, packaging, for each target order received, the item(s) in the target storage compartment corresponding to the target order.

In some optional implementation manners of this embodiment, the fulfillment system may also comprise a storage receptacle holding area, and the target vehicle may also be configured for after sending the target storage compartment identifier to the packaging station, disconnecting with the target storage receptacle, traveling to the storage receptacle holding area, and connecting with a storage receptacle held in the storage receptacle holding area. It may be understood that the target vehicle and the target storage receptacle herein may be two separate parts. To enhance utilization of the target vehicle and reduce the time for the target vehicle to wait for packaging in the packaging station, the target vehicle may disconnect with the target storage receptacle after arriving at the packaging station and sending the target order and the target storage compartment identifier to the packaging station, travel to the storage receptacle holding area, and connect with a storage receptacle in the storage receptacle holding area. In this way, because the packaging station has obtained the target order and the target storage compartment identifier while the target storage receptacle still dwells in the packaging station, the packaging station may package the item(s) in the target storage compartment indicated by the target storage compartment identifier according to the received target order.

In some optional implementation manners of this embodiment, the target vehicle may also be configured for in response to receiving the target transportation indication information, for each of the items corresponding to the target order, traveling to a position of the item, and collecting the item to the target storage compartment. Here, the items corresponding to the target order may be held at different locations in the fulfillment system. For example, the fulfillment system may hold items according to categories, such that different categories of items are held at different sectors of the fulfillment system. When sending the target transportation indication information to the target vehicle, the control server may simultaneously send the location information of each item corresponding to the target order to the target vehicle. In this way, after receiving the target transportation indication information, the target vehicle may obtain, for each of the items corresponding to the target order, the position of the item (e.g., the position of the shelf where the item is located), and then travel to the position of the item, and collect the item to the target storage compartment. As an example, the target vehicle may be provided in association or connected with a robot arm; in this way, the target vehicle may control the associated or connected robot arm to move the item from the holding position in the fulfillment system to the target storage compartment.

In some optional implementation manners of this embodiment, the fulfillment system may also comprise at least one retrieval information receiving device; and that the target vehicle is configured for collecting the item to the target storage compartment may refer to: the target vehicle being configured for presenting retrieval information corresponding to the item, which retrieval information includes the item identifier and the item quantity, or sending the retrieval information corresponding to the item, to the retrieval information receiving device of a picker corresponding to the position of the item, such that the picker corresponding to the position of the item may pick the item according to the retrieval information corresponding to the item as presented or received, and put it into the target storage compartment. Here, the retrieval information receiving device may be a device for receiving the retrieval information. A corresponding picker may be present at the position of each item corresponding to the target order, wherein the picker may be a human picker or a robot picker, and the picker may pick the item. Here, the retrieval information corresponding to the item including the item identifier and item quantity may refer to the item identifier and the ordered item quantity in the item order information corresponding to the item in the target order.

In some optional implementation manners of this embodiment, the at least one retrieval information receiving device in the fulfillment system may include a handheld device and/or a robot picker. As an example, when the picker corresponding to the position of the item is a human picker, the retrieval information receiving device of the picker may be a handheld device corresponding to the human picker. When the picker corresponding to the position of the item is a robot picker, the retrieval information receiving device of the picker may be the robot picker itself.

In some optional implementation manners of this embodiment, the target vehicle may be configured for after traveling to the position of the item and before collecting the item to the target storage compartment, sending the target storage compartment identifier to the retrieval information receiving device of the picker corresponding to the position of the item or presenting the target storage compartment indication information. Namely, the target vehicle needs to let the picker corresponding to the position of the item know where to put the retrieved item, wherein the picker corresponding to the position of the item may determine, based on the received target storage compartment identifier or the presented target storage compartment indication information, which storage compartment in the target storage receptacle is the target storage compartment, retrieve the item and then put it in the target storage compartment. As an example, the target vehicle may be provided with a display, such that the target vehicle may present the target compartment indication information on the provided display.

In some optional implementation manners of this embodiment, each storage compartment in the target storage receptacle may be provided in association with an indicator light and/or a door, and the target vehicle may be electrically connected with the target storage receptacle; and the target vehicle may be configured for controlling to set the indicator light provided in association with the target storage compartment to a state that indicate the storage compartment is the target storage compartment (e.g., light on), and controlling to set the indicator light(s) provided in association with other storage compartment(s) than the target storage compartment to a state that indicate the other storage compartment(s) are not the target storage compartment (e.g., light off); and/or the target vehicle may be configured for controlling to open the door of the target storage compartment. The target vehicle may present the target storage compartment indication information by controlling the state of the indicator light or the door provided in association with the target storage compartment. It may be understood that, the target vehicle here may control, through an instruction, the state of the indicator light or the door provided in association with the target storage compartment. Namely, besides being provided in association with the indicator light and/or the door, each storage compartment in the target storage receptacle also needs to be provided in association with a control hardware module for controlling the state of the indicator light and/or the door, and the control hardware module provided in association with each storage compartment is in electric connection with the target vehicle. It needs to be noted that the target vehicle may be configured for executing the operations above in the following two circumstances: (1) after the target vehicle travels to the position of the item, and before collecting the item/items to the target storage compartment; (2) after the target vehicle travels to the position of the packaging station and sending the target order to the packaging station.

In some optional implementation manners of this embodiment, the packaging station in the fulfillment system may further comprise a robot arm and a packaging platform and the robot arm may be configured for retrieving the item/items in the target storage compartment and moving the item/items retrieved from the target storage compartment to the packaging station. Here, the target vehicle sends the target order and the target storage compartment identifier to the packaging platform after traveling to the packaging station, the packaging station may forward the target storage compartment identifier to the robot arm, and then the robot arm may pick the item(s) therein according to the received target storage compartment identifier and move to the packaging platform. If the target vehicle presents the target storage compartment indication information, the robot arm may pick the item(s) therein according to the presented target storage compartment identifier and move to the packaging platform. For example, if the target vehicle sends the target order to the packaging station after traveling to the packaging station and presents the target storage compartment indication information by controlling to open the door of the target storage compartment, the robot arm may pick the item(s) in the storage compartment with the door open in the target storage receptacle and move to the packaging platform. If the target vehicle sends the target order to the packaging station after traveling to the packaging platform and presents the target storage compartment indication information by controlling to set the state of the indicator light provided in association with the target storage compartment, the robot arm may pick the item(s) in the storage compartment, in the target storage receptacle, whose indicator light indicates that is the target storage compartment, and move to the packaging platform. Here, the packaging platform is configured for holding the to-be-packaged item(s). For example, the packaging platform may be a table surface for holding the to-be-packaged item(s); and a packaging person or a packaging robot may package the item(s) on the packaging platform. For another example, the packaging platform may also be a region in an automatic packaging machine for holding the to-be-packaged item(s).

In some optional implementation manners of this embodiment, a slope may be provided at an inner side bottom portion of the each storage compartment in the target storage receptacle, a first door may be provided at an outer side of the each storage compartment corresponding to a bottom portion of the slope, and a second door and/or the indicator light may be provided at a side corresponding to a top portion of the slope.

In some optional implementation manners of this embodiment, the target vehicle may be configured for after traveling to the position of the item and before collecting the item to the target storage compartment, controlling to open the second door of the target storage compartment and/or controlling to set the indicator light provided in association with the target storage compartment to a state that indicate the storage compartment is the target storage compartment (e.g., light on); and controlling to set the indicator light(s) provided in association with other storage compartment(s) than the target storage compartment in the target storage receptacle to a state that indicate the other storage compartment(s) are not the target storage compartment (e.g., light off). The target vehicle may present the target storage compartment indication information by controlling the state of the indicator light or the second door provided in association with the target storage compartment. For example, the target vehicle is configured for presenting the target storage compartment indication information by controlling to open the second door (i.e., the door at the side corresponding to a top portion of the slope) of the target storage compartment, the picker corresponding to the position of the item may put the retrieved item into the storage compartment with the second door open in the target storage receptacle. If the target vehicle is configured for presenting the target storage compartment indication information by setting the state of the indicator light provided in association with the target storage compartment, the picker corresponding to the position of the item may put the retrieved item into the storage compartment, in the target storage receptacle, whose indicator light indicates that it is the target storage compartment. It needs to be noted that at this point, because it is in a retrieval stage, to prevent the item(s) from falling off the storage compartment, the first door (i.e., the door at the side corresponding to a bottom portion of the slope) of each storage compartment in the target storage receptacle is in a closed state.

In some optional implementation manners of this embodiment, the packaging station in the fulfillment system may further comprise a packaging platform; and the target vehicle may be configured for after sending the target order to the packaging station, controlling to open the first door (i.e., the door at the side corresponding to a bottom portion of the slope) of the target storage compartment such that under the action of gravity, the item(s) in the target storage compartment will slide off onto the packaging platform, such that the packaging station may package the item(s) sliding off onto the packaging platform.

The fulfillment system provided by the embodiment of the present disclosure does not need an additional sorting step and thereby reduces fulfillment costs through sending, by the control server, target transportation indication information corresponding to a target order to a target vehicle, wherein the target transportation indication information includes the target order and a target storage compartment identifier and the target storage compartment identifier is configured for indicating a target storage compartment in a target storage receptacle connected with the target vehicle; and then collecting, by the target vehicle, an item/items corresponding to the target order to the target storage compartment in response to receiving the target transportation indication information, thereby collecting the item(s) corresponding to each order into the storage compartment corresponding to the order.

Figure 2:
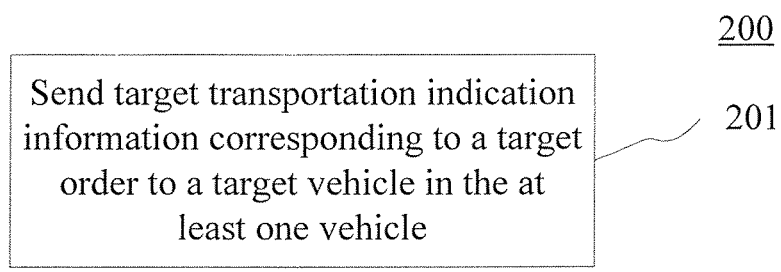
FIG. 2 is a flow diagram of an embodiment of a sorting method applied to a control server in a fulfillment system according to the present disclosure.

Continue to refer to FIG. 2, which shows a flow diagram 200 of an embodiment of a sorting method applied to a control server in a fulfillment system according to the present disclosure, wherein the fulfillment system may comprise: a control server, at least one vehicle, and at least one storage receptacle connected with the vehicle, the storage receptacle including at least one storage compartment. The sorting method applied to the control server in the fulfillment system comprises steps of:

Step 201: sending target transportation indication information corresponding to a target order to a target vehicle in the at least one vehicle.

In this embodiment, an electronic device (e.g., the controller server shown in FIG. 1) on which the sorting method applied to the control server in the fulfillment system is executed may send the target transportation indication information corresponding to the target order to the target vehicle in the at least one vehicle in a wired connection manner or a wireless connection manner.

In this embodiment, the target order may be any specific order in a set of to-be-processed orders in the electronic device. Here, the illustration is only made with the target order as an example. It may be understood that the electronic device may send, with each order in the set of to-be-processed orders as the target order, the target transportation indication information corresponding to the determined target order to the target vehicle corresponding to the target order.

In this embodiment, the target vehicle is a vehicle in the at least one vehicles in the fulfillment system for collecting respective item(s) corresponding to the target order. In practice, the electronic device may adopt various implementation manners to determine a certain vehicle in the at least one vehicles in the fulfillment system as the target vehicle. The methods of determining the target vehicle corresponding to the target order are prior arts that are currently widely studied and applied, which are thus not detailed here. For example, the electronic device may determine the target vehicle corresponding to the target order based on a current state (e.g., a working state or an idle state) of each vehicle in the fulfillment system, basic information of at least one storage receptacle connected with the vehicle (the number of storage compartments in the storage receptacle, and a volume of each storage compartment), a current storage state (e.g., the volume of the item(s) currently held in each storage compartment), and size information of the item(s) involved in the target order.

In this embodiment, the target transportation indication information may include the target order and a target storage compartment identifier, the target storage compartment identifier being configured for indicating a target storage compartment in a target storage receptacle connected with the target vehicle. Here, the target storage compartment refers to a storage compartment, in the target storage receptacle determined by the electronic device, for holding respective item(s) corresponding to the target order. It needs to be noted that the target storage compartment may be at least one target storage compartment; correspondingly, the target storage compartment identifier may also be at least one target storage compartment identifier. In practice, the electronic device may adopt various implementation manners to determine at least one storage compartment in the target storage receptacle as the target storage compartment. The methods of determining a target storage compartment in the target storage receptacle for holding the item(s) corresponding to the target order are prior arts currently widely studied and applied, which are not detailed here. For example, the electronic device may determine the target storage compartment based on current holding capacity information of respective storage compartments in the target storage receptacle and size information of the item(s) involved in the target order.

After determining the target vehicle and the target storage compartment, the electronic device may send the target transportation indication information corresponding to the target order to the target vehicle. In this way, the target vehicle may collect an item/items corresponding to the target order to the target storage compartment in response to receiving the target transportation indication information.

In this embodiment, because the target vehicle has received the target transportation indication information, while the target transportation indication information includes the target order and the target storage compartment identifier, for each item order information in the target order, the target vehicle may collect the item(s) held in the fulfillment system identified by the item identifier in the item order information and with the number of the ordered item quantity in the item order information to the target storage compartment. In this way, the target vehicle may collect the item(s) corresponding to the target order to the target storage compartment according to the target order.

It needs to be noted that the electronic device may send for multiple times, with a certain order in the set of to-be-processed orders as the target order, the target transportation indication information corresponding to the determined target order to the target vehicle, and the target vehicle may collect for multiple times the item/items corresponding to the target order to the target storage compartment in response to receiving the target transportation indication information. The target vehicle determined by the electronic device in each time may be a same vehicle in the at least one vehicle in the fulfillment system, or a different vehicle, while a certain specific vehicle in the at least one vehicle may receive a plurality of different target transportation indication information. To sum up, the electronic device records the target vehicle corresponding to each order and the target storage compartment; moreover, each target vehicle also records each target order received by the target vehicle and the corresponding target storage compartment; therefore, an additional sorting step according to orders will not be needed, which further reduces fulfillment costs.

The sorting method applied to the control server in the fulfillment system provided by the embodiment of the present disclosure reduces fulfillment costs by sending target transportation indication information corresponding to a target order to a target vehicle in at least one vehicle.

Figure 3:
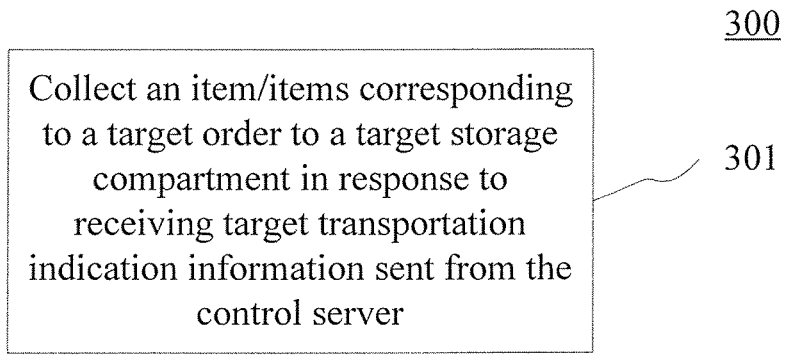
FIG. 3 is a flow diagram of an embodiment of a sorting method applied to a vehicle in a fulfillment system according to the present disclosure.

Continue referring to FIG. 3, which shows a flow diagram 300 of an embodiment of a sorting method 300 applied to a vehicle in a fulfillment system according to the present disclosure, wherein the fulfillment system may comprise a control server, at least one vehicle, and at least one storage receptacle connected with the vehicle; the storage receptacle may include at least one storage compartment. The sorting method applied to a vehicle in a fulfillment system comprises steps of:

Step 301: collecting an item/items corresponding to a target order to a target storage compartment in response to receiving target transportation indication information sent from the control server.

In this embodiment, a vehicle (e.g., the vehicle shown in FIG. 1) on which the sorting method applied to a vehicle in a fulfillment system may be executed may collect the item/items corresponding to the target order to the target storage compartment in response to receiving the target transportation indication information sent from the control server, wherein the target transportation indication information may include the target order and a target storage compartment identifier, the target storage compartment identifier being configured for indicating the target storage compartment in a target storage receptacle connected with the vehicle.

In this embodiment, the target order may be any specific order in a set of to-be-processed orders in the control server. Here, the illustration is only made with the target order as an example. It may be understood that after receiving the target transportation indication information corresponding to each target order sent from the control server, the vehicle may collect the item(s) corresponding to the target order in the transportation indication information to the target storage compartment.

In this embodiment, the order may be information generated from ordering a product by a user. The order may include recipient information and at least one item order information, wherein the recipient information refers to basic information about the recipient, e.g., the recipient information may include: name of the recipient, address of the recipient and telephone number of the recipient, while the item order information may include: an item identifier and an ordered item quantity, wherein the item identifier is configured for uniquely identifying each item in a set of preset items.

In this embodiment, because the vehicle receives the target transportation indication information, while the target transportation indication information includes the target order and the target storage compartment identifier, for each item order information in the target order, the vehicle may collect the item(s) held in the fulfillment system identified by the item identifier in the item order information and with the number of the ordered item quantity in the item order information to the target storage compartment. In this way, the vehicle may collect the item(s) corresponding to the target order to the target storage compartment according to the target order.

Here, the target transportation indication information is sent by the control server to the vehicle; therefore, the control server records the target vehicle corresponding to each target order and the target storage compartment. Further, the vehicle may collect the item(s) corresponding to the target order in the target transportation indication information to the storage compartment indicated by the target storage compartment identifier in the target transportation indication information upon each time of receiving the target transportation indication information. The vehicle may also be a certain vehicle in the at least one vehicle in the fulfillment system. Namely, each vehicle in the fulfillment system records each target order received by the vehicle and the corresponding target storage compartment; therefore, the additional step of sorting based on orders will not be needed, which thereby reduces fulfillment costs.

In some optional implementation manners of this embodiment, the step 301 may be executed by: in response to receiving the target transportation indication information sent from the control server, for each of the items corresponding to the target order, traveling to a position of the item, and collecting the item to the target storage compartment. Here, the items corresponding to the target order may be held at different locations in the fulfillment system. For example, the fulfillment system may hold items according to categories, such that different categories of items are held at different sectors of the fulfillment system. When receiving the target transportation indication information sent from the control server, the vehicle may also receive the location information of each item corresponding to the target order sent from the control server. In this way, after receiving the target transportation indication information sent from the control server, the vehicle may obtain, for each of the items corresponding to the target order, the position of the item (e.g., the position of the shelf where the item is located), and then travel to the position of the item, and collect the item to the target storage compartment. As an example, the vehicle may be provided in association or connected with a robot arm; in this way, the vehicle may control the associated or connected robot arm to move the item from the holding position in the fulfillment system to the target storage compartment.

In some optional implementation manners of this embodiment, the fulfillment system may also comprise at least one retrieval information receiving device; and collecting, by the vehicle, the item to the target storage compartment may refer to: presenting, by the vehicle, retrieval information corresponding to the item, which retrieval information includes the item identifier and the item quantity, or sending the retrieval information corresponding to the item, to the retrieval information receiving device of a picker corresponding to the position of the item, such that the picker corresponding to the position of the item may pick the item according to the retrieval information corresponding to the item as presented or received, and put it into the target storage compartment. Here, the retrieval information receiving device may be a device being configured for receiving the retrieval information. A corresponding picker may be present at the position of each item corresponding to the target order, wherein the picker may be a human picker or a robot picker, and the picker may pick items. Here, the retrieval information corresponding to the item including the item identifier and item quantity may refer to the item identifier and the ordered item quantity in the item order information corresponding to the item in the target order.

In some optional implementation manners of this embodiment, the at least one retrieval information receiving device in the fulfillment system may include a handheld device and/or a robot picker. As an example, when the picker corresponding to the position of the item is a human picker, the retrieval information receiving device of the picker may be a handheld device corresponding to the human picker. When the picker corresponding to the position of the item is a robot picker, the retrieval information receiving device of the picker may be the robot picker itself.

In some optional implementation manners of this embodiment, the vehicle may send, after traveling to the position of the item and before collecting the item to the target storage compartment, the target storage compartment identifier to the retrieval information receiving device of the picker corresponding to the position of the item or present the target storage compartment indication information. Namely, the vehicle needs to let the picker corresponding to the position of the item know where to put the retrieved item, wherein the picker corresponding to the position of the item may determine, based on the received target storage compartment identifier or the presented target storage compartment indication information, which storage compartment in the target storage receptacle is the target storage compartment, retrieve the item and then put it in the target storage compartment. As an example, the vehicle may be provided with a display, such that the vehicle may present the target compartment indication information on the provided display.

In some optional implementation manners of this embodiment, each storage compartment in the target storage receptacle may be provided in association with an indicator light and/or a door, and the target vehicle may be electrically connected with the target storage receptacle; and the vehicle may present the target storage compartment indication information through the following operations after traveling to the position of the item and before collecting the item to the target storage compartment: controlling to set the indicator light provided in association with the target storage compartment to a state that indicate the storage compartment is the target storage compartment (e.g., light on) and controlling to set the indicator light(s) provided in association with other storage compartment(s) than the target storage compartment to a state that indicate the other storage compartment(s) are not the target storage compartment (e.g., light off); and/or controlling to open the door of the target storage compartment. It may be understood that, the vehicle here may control, through an instruction, the state of the indicator light or the door provided in association with the target storage compartment. Namely, besides being provided in association with the indicator light and/or the door, each storage compartment in the target storage receptacle also needs to be provided in association with a control hardware module for controlling the state of the indicator light and/or the door, and the control hardware module provided in association with each storage compartment is in electric connection with the target vehicle. For example, if the vehicle presents the target storage compartment indication information by controlling to open the door provided in association with the target storage compartment, the picker corresponding to the position of the item may put the retrieved item into the storage compartment with the door open in the target storage receptacle. If the vehicle presents the target storage compartment indication information by controlling to set the state of the indicator light provided in association with the target storage compartment, the picker corresponding to the position of the item may put the retrieved item into the storage compartment, in the target storage receptacle, whose indicator light indicates that it is the target storage compartment.

In some optional implementation manners of this embodiment, a slope may be provided at an inner side bottom portion of the each storage compartment in the target storage receptacle, a first door may be provided at an outer side of the each storage compartment corresponding to a bottom portion of the slope, and a second door and/or the indicator light may be provided at a side corresponding to a top portion of the slope.

In some optional implementation manners of this embodiment, the vehicle may present the target storage compartment indication information by the following method after traveling to the position of the item and before collecting the item to the target storage compartment: controlling to open the second door of the target storage compartment and/or controlling to set the indicator light provided in association with the target storage compartment to a state that indicate the storage compartment is the target storage compartment (e.g., light on); and controlling to set the indicator light(s) provided in association with other storage compartment(s) than the target storage compartment in the target storage receptacle to a state that indicate the other storage compartment(s) are not the target storage compartment (e.g., light off). For example, if the vehicle presents the target storage compartment indication formation by controlling to open the second door (i.e., the door at the side corresponding to a top portion of the slope) of the target storage compartment, the picker corresponding to the position of the item may put the retrieved item into the storage compartment with the second door open the target storage receptacle. If the target vehicle presents the target storage compartment indication information by controlling to set the state of the indicator light provided in association with the target storage compartment, the picker corresponding to the position of the item may put the retrieved item into the storage compartment, in the target storage receptacle, whose indicator light indicates that it is the target storage compartment. It needs to be noted that at this point, because it is in a retrieval stage, to prevent the item(s) from falling off the storage compartment, the first door (i.e., the door at the side corresponding to a bottom portion of the slope) of each storage compartment in the target storage receptacle is in a closed state.

The sorting method applied to the vehicle in the fulfillment system provided by the embodiment of the present disclosure will save the need of the additional step of storing the items according to orders by collecting an item/items corresponding to a target order to a target storage compartment in response to receiving target transportation indication information sent from the control server, which reduces fulfillment costs.

Figure 4:
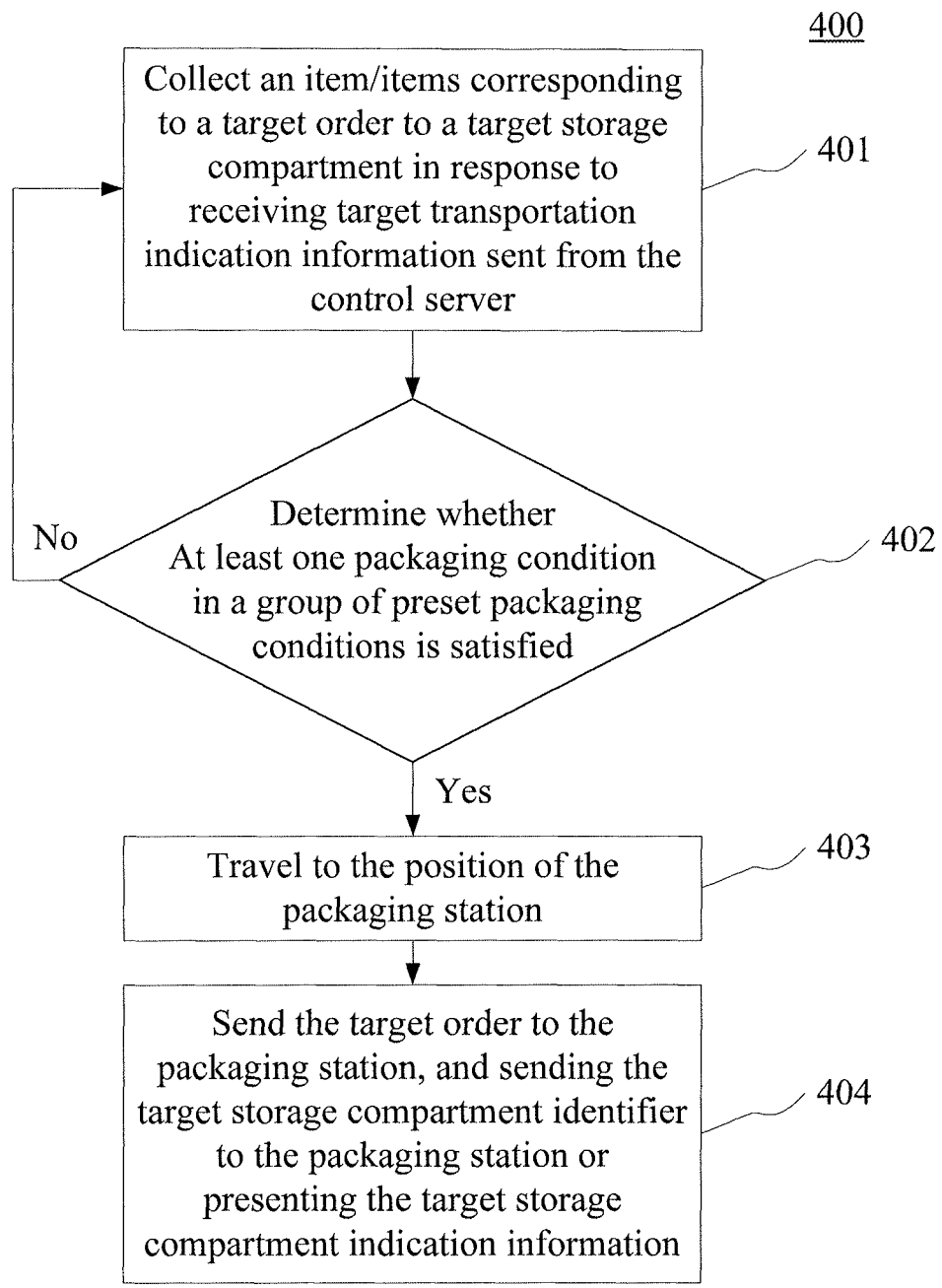
FIG. 4 is a flow diagram of another embodiment of a sorting method applied to a vehicle in a fulfillment system according to the present disclosure.

Continue to refer to FIG. 4, which shows a flow diagram 400 of another embodiment of a sorting method applied to a vehicle in a fulfillment system according to the present disclosure, wherein the fulfillment system may comprise: a control server, a packaging station, at least one vehicle, and at least one storage receptacle connected with the vehicle; the storage receptacle may include at least one storage compartment. The sorting method applied to a vehicle in a fulfillment system comprises steps of:

Step 401: collecting an item/items corresponding to a target order to a target storage compartment in response to receiving target transportation indication information sent from the control server.

In this embodiment, a specific operation of step 401 is substantially identical to the specific operation of the step 301 in the embodiment shown in FIG. 3, which will not be detailed here.

Step 402: determining whether at least one packaging condition in a group of preset packaging conditions is satisfied.

In this embodiment, after completing the step 401, a vehicle (e.g., the vehicle in FIG. 1) on which the sorting method applied to the vehicle in the fulfillment system is executed may determine whether at least one packaging condition in the group of preset packaging conditions is satisfied; if so, jump to step 403; if not, jump to step 401.

As an example, the group of preset packaging conditions may include at least one of the following conditions:

1. The number of available storage compartments in the target storage receptacle connected to the vehicle is less than a first preset number. For example, the number of available storage compartments in the target storage receptacle is less than 1, i.e., all storage compartments in the target storage receptacle have items stored, and there is already no available storage compartment in the target storage receptacle.

2. A space utilization of the target storage receptacle connected to the vehicle is larger than a preset utilization threshold. Here, the space utilization of the target storage receptacle may be a ratio between a volume of items held in the target storage receptacle and a sum of the volumes of each storage compartment of the target storage receptacle.

3. The number of transportation indication information received by the vehicle is larger than or equal to a second preset number. For example, supposing that each storage compartment is for holding the item(s) corresponding to one order, the second preset number may be the number of storage compartments in the target storage receptacle.

4. The vehicle receives a suspend instruction that controls the target vehicle to suspend transportation.

Step 403: traveling to the position of the packaging station.

In this embodiment, the vehicle may travel to the position of the packaging station in the case of determining in step 402 that at least one of the packaging conditions in the group of preset packaging conditions is satisfied. Here, the packaging station may implement packaging of the item. For example, at the packaging station, the item may be manually packaged or automatically packaged (e.g., packaging with an automatic packaging machine).

Step 404: sending the target order to the packaging station, and sending the target storage compartment identifier to the packaging station or presenting the target storage compartment indication information.

In this embodiment, the vehicle may send the target order to the packaging station, and send the target storage compartment identifier to the packaging station or present the target storage compartment indication information after traveling to the packaging station, wherein the target storage compartment indication information is configured for indicating whether each storage compartment in the target receptacle is the target storage compartment, while the packaging station may package the item(s) in the target storage compartment based on the received target order.

Here, the vehicle sends the target order to the packaging station; then the packaging station may generate recipient information based on the recipient information in the target order, and the packaging station may also determine what kind of materials (e.g., carton, plastic bag, adhesive tape, packaging tape, etc.) are needed to package the item(s) corresponding to the target order, how many materials are used to package, as well as a specific packaging manner (e.g., sealing by adhesive tape, vertically bundling, and laterally bundling), based on the item order information in the target order.

If the vehicle sends the target storage compartment identifier to the packaging station, the packaging station may determine the target storage compartment for holding the item(s) to package based on the received target storage compartment identifier, thereby packaging the item(s) in the target storage compartment.

If the target vehicle presents the target storage compartment indication information, the packaging station may obtain the target storage compartment indication information, and get to know which one is the target storage compartment in the target storage receptacle, and which are not based on the obtained target storage compartment identification information, and package the item(s) in the target storage compartment. As an example, the target vehicle may be provided with a display; in this way, the target vehicle may present the target storage compartment indication information on the provided display.

It needs to be noted that the target order and the target storage compartment identifier/target storage compartment indication information here may be a plurality of target orders and corresponding target storage compartment identifiers/target storage compartment indication formation, i.e., they may be target orders and target storage compartment identifiers/target storage compartment indication information corresponding to respective target transportation indication information received by the target vehicle before determining whether at least one packaging condition in a group of preset packaging conditions is satisfied. In this way, the vehicle may send, for each target transportation indication information in the plurality of target transportation indication information, the target order in the transportation indication information to the packaging station, and send the target storage compartment identifier in the transportation indication information to the packaging station, or present the target storage compartment indication information corresponding to the target storage compartment identifier in the transportation indication information. As a result, the packaging station may package, for each target order received, the item(s) in the target storage compartment corresponding to the target order.

In some optional implementation manners of this embodiment, each storage compartment in the target storage receptacle may be provided in association with an indicator light and/or a door, and the target vehicle may be electrically connected with the target storage receptacle; and presenting by the vehicle, the target storage compartment indication information after sending the target order to the packaging station may be performed by: controlling to set the indicator light provided in association with the target storage compartment to a state that indicate the storage compartment is the target storage compartment (e.g., light on), and controlling to set the indicator light(s) provided in association with other storage compartment(s) than the target storage compartment to a state that indicate the other storage compartment(s) are not the target storage compartment (e.g., light off); and/or controlling to open the door of the target storage compartment. It may be understood that, the vehicle here may control, through an instruction, the state of the indicator light or the door provided in association with the target storage compartment. Namely, besides being provided in association with the indicator light and/or the door, each storage compartment in the target storage receptacle also needs to be provided in association with a control hardware module for controlling the state of the indicator light and/or the door, and the control hardware module provided in association with each storage compartment is in electric connection with the target vehicle. As an example, if the vehicle sends the target order the packaging station after traveling to the packaging station and presents the target storage compartment indication information by controlling to set the state of the indicator light provided in association with the target storage compartment, the packaging station may package the item(s) in the storage compartment in the target storage receptacle, whose indicator light indicates that it is the target storage compartment, based on the target order. If the vehicle sends the target order to the packaging station after traveling to the packaging station and presents the target storage compartment indication information by controlling to open the door provided in association with the target storage compartment, the packaging station may package the item(s) in the storage compartment, in the target storage receptacle, whose door is opened, based on the target order.

In some optional implementation manners of this embodiment, a slope may be provided at an inner side bottom portion of the each storage compartment in the target storage receptacle, a first door may be provided at an outer side of the each storage compartment corresponding to a bottom portion of the slope, and a second door and/or the indicator light may be provided at a side corresponding to a top portion of the slope.

In some optional implementation manners of this embodiment, the packaging station in the fulfillment system may further comprise a packaging platform; and sending, by the vehicle, the target order to the packaging station and presenting the target storage compartment indication information may be executed as follows: after sending the target order to the packaging station, controlling to open the first door (i.e., the door at the side corresponding to a bottom portion of the slope) of the target storage compartment such that under the action of gravity, the item(s) in the target storage compartment will slide off onto the packaging platform, such that the packaging station may package the item(s) sliding off onto the packaging platform. Here, the packaging platform is configured for holding the to-be-packaged item(s). For example, the packaging platform may be a table surface for holding the to-be-packaged item(s); and a packaging person or a packaging robot may package the item(s) on the packaging platform. For another example, the packaging platform may also be a region in an automatic packaging machine being configured for holding the to-be-packaged item(s).

It is seen from FIG. 4 that compared with the embodiment corresponding to FIG. 3, the flow 400 of the sorting method applied to a vehicle in the fulfillment system in the present embodiment provides additional steps of traveling to the position of the packaging station when determining that at least one of the packaging condition in the group of preset packaging conditions is satisfied, and sending the target order to the packaging station, and sending the target storage compartment identifier to the packaging station or presenting the target storage compartment indication information. Therefore, the solution described by the present embodiment may hold the item(s) corresponding to each order in the plurality of orders in a target storage compartment corresponding to the order in the storage receptacle and shipping it to the packaging station, which does not need an additional storing step but directly implements the packaging operation, thereby further reducing the fulfillment costs and enhancing the work efficiency of the fulfillment system.

Figure 5:
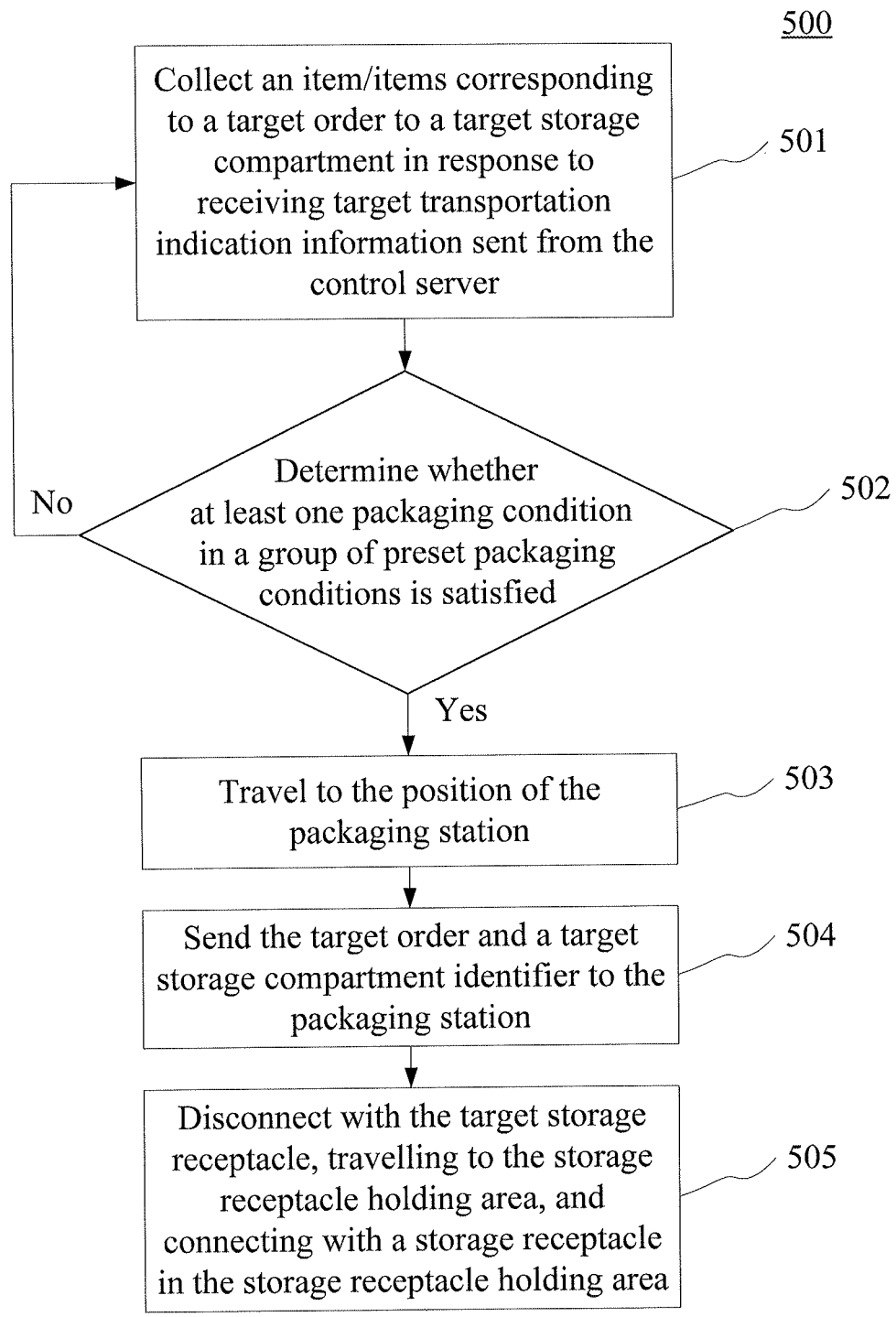
FIG. 5 is a flow diagram of a further embodiment of a sorting method applied to a vehicle in a fulfillment system according to the present disclosure.

Continue to refer to FIG. 5, which shows a flow diagram 500 of a further embodiment of a sorting method applied to a vehicle in a fulfillment system according to the present disclosure, wherein the fulfillment system may comprise: a control server, a packaging station, a storage receptacle holding area, at least one vehicle, and at least one storage receptacle connected with the vehicle; the storage receptacle may include at least one storage compartment. The sorting method applied to a vehicle in a fulfillment system comprises steps of:

Step 501: collecting an item/items corresponding to a target order to a target storage compartment in response to receiving target transportation indication information sent from the control server.

Step 502: determining whether at least one packaging condition in a group of preset packaging conditions is satisfied.

In this embodiment, after completing the step 501, a vehicle (e.g., the vehicle in FIG. 1) on which the sorting method applied to a vehicle in the fulfillment system is executed may determine whether at least one packaging condition in a group of preset packaging conditions is satisfied; if so, jump to step 503; if not, jump to step 501.

Step 503: traveling to the position of the packaging station.

In this embodiment, the vehicle may travel to the position of the packaging station in the case of determining in step 502 that at least one packaging condition in the group of preset packaging conditions is satisfied. Here, the packaging station may implement packaging of the item(s). For example, at the packaging station, the item(s) may be manually packaged or automatically packaged (e.g., packaging with an automatic packaging machine).

In this embodiment, specific operations of steps 501, 502, and 503 are substantially identical to the specific operations of the steps 401, 402, and 403 in the embodiment shown in FIG. 4, which will not be detailed here.

Step 504: sending the target order and a target storage compartment identifier to the packaging station.

In this embodiment, the vehicle (e.g., the vehicle in FIG. 1) on which the sorting method applied to a vehicle in the fulfillment system is executed may send the target order and the target storage compartment identifier to the packaging station after traveling to the packaging station; in this way, the packaging station may package the item in the target storage compartment indicated by the target storage compartment identifier based on the received target order.

Step 505: disconnecting with the target storage receptacle, traveling to the storage receptacle holding area, and connecting with a storage receptacle in the storage receptacle holding area.

In this embodiment, the vehicle and the target storage receptacle may be two separate parts. To enhance utilization of the target vehicle and reduce the time for the target vehicle to wait for packaging in the packaging station, the vehicle may disconnect with the target storage receptacle after arriving at the packaging station and sending the target order and the target storage compartment identifier to the packaging station, travel to the storage receptacle holding area, and connect with a storage receptacle in the storage receptacle holding area. In this way, because the packaging station has obtained the target order and the target storage compartment identifier and the target storage receptacle still dwells in the packaging station, the packaging station may package the item(s) in the target storage compartment indicated by the target storage compartment identifier according to the received target order.

It may be seen from FIG. 5 that compared with the embodiment corresponding to FIG. 4, the flow 500 of the sorting method applied to a vehicle in the fulfillment system in the present embodiment provides additional steps of sending the target order and a target storage compartment identifier to the packaging station after the vehicle arrives at the packaging station, disconnecting with the target storage receptacle, traveling to the storage receptacle holding area, and connecting with a storage receptacle in the storage receptacle holding area, which reduces the time for the vehicle to wait for packaging in the packaging station and improves utilization of the vehicle, thereby further reducing the fulfillment costs and enhancing the work efficiency of the fulfillment system.

Figure 6:
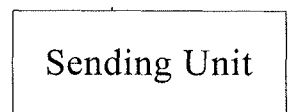
FIG. 6 is a structural schematic diagram of an embodiment of a storing apparatus applied to a control server in a fulfillment system according to the present disclosure.

Further referring to FIG. 6, as an implementation of the methods showing in the figures above, the present disclosure provides an embodiment of a sorting apparatus applied to a control server in a fulfillment system, wherein the fulfillment system may comprise: a control server, at least one vehicle, and at least one storage receptacle connected with the vehicle, the storage receptacle including at least one storage compartment. This apparatus embodiment corresponds to the method embodiment shown in FIG. 2, and this apparatus may be specifically applied to various kinds of electronic devices.

As illustrated in FIG. 6, the sorting apparatus 600 applied to the control server in the fulfillment system comprises: a sending unit 601 configured for sending target transportation indication information corresponding to a target order to a target vehicle in the at least one vehicle, wherein the target transportation indication information includes the target order and a target storage compartment identifier, the target storage compartment identifier being configured for indicating a target storage compartment in a target storage receptacle connected with the target vehicle; and wherein the target vehicle collects an item/items corresponding to the target order to the target storage compartment in response to receiving the target transportation indication information.

In this embodiment, the specific processing of the sending unit 601 of the sorting apparatus 600 applied to the control server in the fulfillment system, as well as the technical effect brought thereby, may refer to relevant illustrations of step 201 in the embodiment corresponding to FIG. 2, which will not be detailed here.

It needs to be noted that implementation details and technical effects of respective units in the sorting apparatus applied to the control server in the fulfillment system provided in the embodiment of the present disclosure may refer to the illustrations in other embodiments of the present disclosure, which will not be detailed here.

Figure 7:
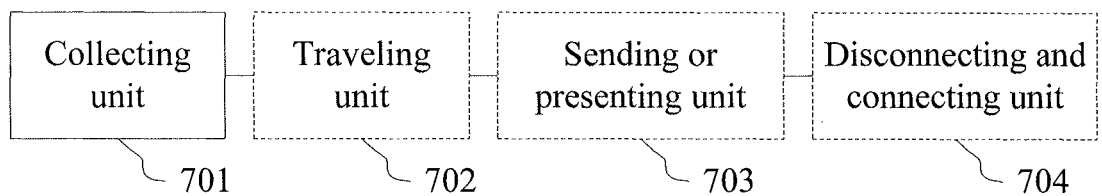
FIG. 7 is a structural schematic diagram of an embodiment of a storing apparatus applied to a vehicle in a fulfillment system according to the present disclosure.

Further referring to FIG. 7, as an implementation to the methods shown in the figures above, the present disclosure provides an embodiment of a sorting apparatus applied to a vehicle in the fulfillment system, wherein the fulfillment system comprises: a control server, at least one vehicle, and at least one storage receptacle connected with the vehicle, the storage receptacle including at least one storage compartment. This apparatus embodiment corresponds to the method embodiment shown in FIG. 3, and this apparatus may be specifically applied to various kinds of electronic devices.

As illustrated in FIG. 7, the sorting apparatus 700 applied to the vehicle in the fulfillment system according to this embodiment comprises: a collecting unit 701 configured for collecting an item/items corresponding to a target order to a target storage compartment in response to receiving target transportation indication information sent from the control server, wherein the target transportation indication information includes the target order and a target storage compartment identifier, the target storage compartment identifier being configured for indicating the target storage compartment in a target storage receptacle connected with the vehicle.

In this embodiment, the specific processing of the collecting unit 701 of the sorting apparatus 700 applied to the vehicle in the fulfillment system, as well as the technical effect brought thereby, may refer to relevant illustrations of step 301 in the embodiments corresponding to FIG. 3, which will not be detailed here.

In some optional implementation planners of this embodiment, the fulfillment system may further comprise a packaging station; and the apparatus 700 may further comprise; a traveling unit 702 configured for traveling to a position of the packaging station in response to determining that at least one packaging condition in a group of preset packaging conditions is satisfied.

In some optional implementation manners of this embodiment, the apparatus 700 may further comprise: a sending or presenting unit 703 configured for after traveling to the position of the packaging station, sending the target order to the packaging station, and sending the target storage compartment identifier to the packaging station or presenting the target storage compartment indication information, wherein the target storage compartment indication information is configured for indicating whether each storage compartment in the target receptacle is the target storage compartment; and wherein the packaging station, packages the item/items in the target storage compartment according to the target order.

In some optional implementation manners of this embodiment, the fulfillment system may further comprise a storage receptacle holding area; and the apparatus 700 may further comprise a disconnecting and connecting unit 704 configured for after sending the target storage compartment identifier to the packaging station, disconnecting with the target storage receptacle, traveling to the storage receptacle holding area, and connecting with a storage receptacle held in the storage receptacle holding area.

In some optional implementation manners of this embodiment, the collecting unit 701 may be further configured for in response to receiving the target transportation indication information from the control server, for each of the items corresponding to the target order, traveling to a position of the item, and collecting the item to the target storage compartment.

In some optional implementation manners of this embodiment, the fulfillment system may further comprise at least one retrieval information receiving device; and the collecting unit 701 may be further configured for presenting retrieval information corresponding to the item, which retrieval information includes an item identifier and an item quantity, or sending the retrieval information corresponding to the item, to the retrieval information receiving device of a picker corresponding to the position of the item, wherein the picker corresponding to the position of the item picks the item according to the retrieval information corresponding to the item and puts the item into the target storage compartment.

In some optional implementation manners of this embodiment, the at least one retrieval information receiving device may include a handheld device and/or a robot picker.

In some optional implementation manners of this embodiment, the collecting unit 701 may be further configured for after traveling to the position of the item and before collecting the item to the target storage compartment, sending the target storage compartment identifier to the retrieval information receiving device of the picker corresponding to the position of the item or presenting the target storage compartment indication information.

In some optional implementation manners of this embodiment, each storage compartment in the target storage receptacle may be provided in association with an indicator light and/or a door, and the target vehicle may be electrically connected with the target storage receptacle; and presenting the target storage compartment indication information may comprise: controlling to set the indicator light provided in association with the target storage compartment to a state that indicate the storage compartment is the target storage compartment, and controlling to set the indicator light(s) provided in association with other storage compartment(s) than the target storage compartment to a state that indicate the other storage compartment(s) are not the target storage compartment; and/or controlling to open the door of the target storage compartment.

In some optional implementation manners of this embodiment, the packaging station may further comprise a robot arm and a packaging platform; and packaging, by the packaging station, the item/items in the target storage compartment according to the target order may comprise: retrieving, by the robot arm, the item/items in the target storage compartment and moving the item/items retrieved from the target storage compartment to the packaging platform.

In some optional implementation manners of this embodiment, a slope is provided at an inner side bottom portion of the each storage compartment in the target storage receptacle, a first door is provided at an outer side of the each storage compartment corresponding to a bottom portion of the slope, and a second door and/or the indicator light is provided at a side corresponding to a top portion of the slope.

In some optional implementation manners of this embodiment, the collecting unit 701 may be further configured for controlling to open the second door of the target storage compartment and/or controlling to set the indicator light provided in association with the target storage compartment to a state that indicate the storage compartment is the target storage compartment; and controlling to set the indicator light(s) provided in association with other storage compartment(s) than the target storage compartment in the target storage receptacle to a state that indicate the other storage compartment(s) are not the target storage compartment.

In some optional implementation manners of this embodiment, the packaging station may further comprise a packaging platform; and the sending or presenting unit 703 may be further configured for after sending the target order to the packaging station, controlling to open the first door of the target storage compartment such that the item(s) in the target storage compartment slides off onto the packaging platform.

It needs to be noted that implementation details and technical effects of respective units in the sorting apparatus applied to the vehicle in the fulfillment system provided in the embodiment of the present disclosure may refer to the illustrations in other embodiments of the present disclosure, which will not be detailed here.

Figure 8:
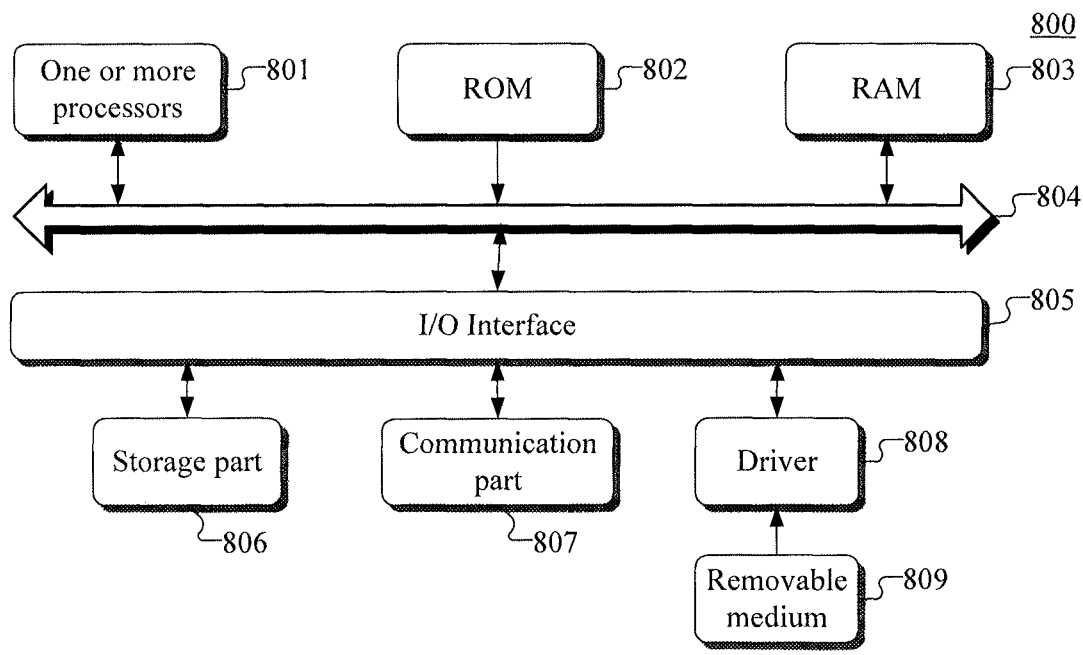
FIG. 8 is a structural schematic diagram of a computer system suitable for implementing a control server or a control apparatus in a vehicle in the embodiments of the present disclosure.

Now, refer to FIG. 8, which shows a structural schematic diagram of a computer system 800 of a control server or a control apparatus in a vehicle, which is adapted for implementing the embodiments of the present disclosure. The computer system shown in FIG. 8 is only an example, which should not bring any limitation to the functions and use scopes of the embodiments of the present disclosure.

As shown in FIG. 8, the computer system 800 comprises one or more processors 801 which may perform various kinds of appropriate actions and processing based on computer program stored in a read-only memory (ROM) 802 or computer program loaded into the random-access memory (RAM) 803 from a memory part 806. In RAM 803, there may also store various kinds of programs and data needed for operations of the system 800. One or more processors 801, ROM 802, and RAM 803 are connected with each other via a bus 804. The input/output (I/O) interface 805 may also be connected to the bus 804.

The following components are connected to the I/O interface 705, including: a memory part 806 including a hard disk, etc.; and a communication part 807 including a network interface card such as a LAN (Local Area Network) card, a modem, etc. The communication part 807 performs communication processing via a network such as the Internet. A driver 808 is also connected to the I/O interface 805 as needed. A removable medium 809, such as a magnetic disk, an optical disk, a magneto-optical disk, and a semiconductor memory, etc., is mounted on the driver 808 as needed, so as to facilitate the computer program read therefrom to be installed in the memory part 806.

Particularly, according to the embodiments of the present disclosure, the processes described above with reference to the flow diagrams may be implemented as computer software programs. For example, an embodiment of the present disclosure includes a computer program product that has a computer program carried on a computer-readable medium, the computer program containing computer codes for executing the methods shown in the flow diagrams. In such an embodiment, the computer programs may be downloaded and installed from a network through the communication part 807 and/or installed from the removable medium 809. When being executed by the one or more processors 801, the computer programs execute the functions limited in the methods of the present disclosure. It needs to be noted that the computer readable medium as described in the present disclosure may be a computer-readable signal medium or a computer-readable storage medium or any combination thereof. The computer-readable storage medium, for example, may be, but not limited to, an electrical, magnetic, optical, electromagnetic, infrared, or semiconductor system, apparatus or device, or any combination thereof. More specific examples of the computer-readable storage medium may include, but not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof. In the present disclosure, the computer-readable storage medium may be any tangible medium containing or storing a program that may be used by an instruction executing system, apparatus, or device or used in combination therewith. Further, in the present disclosure, the computer-readable signal medium may include a data signal propagated in a baseband or as part of a carrier, in which computer-readable program code are carried. A data signal propagated in such a way may assume a plurality of forms, including, but not limited to, an electromagnetic signal, an optical signal, or any appropriate combination thereof. The computer-readable signal medium may also be any computer-readable medium other than the computer-readable storage medium, which computer-readable medium may send, propagate or transmit the programs used by the instruction executing system, apparatus or device or used in combination therewith. The program code embodied on the computer-readable medium may be transmitted using any appropriate medium, including, but not limited to: wireless, wired, cable, RF, etc., or any appropriate combination thereof.

One or more programming languages or a combination thereof may be used to compile the computer program codes for executing the operations in the present disclosure. The programming languages include object-oriented programming languages such as (Java, Smalltalk, C++), and also include conventional procedural programming languages (such as "C" language or similar programming languages). The program code may be completely executed on a user computer, partially executed on the user computer, executed as an independent software packet, or partially executed on the user computer while partially executed on the remote computer, or completely executed on the remote computer or the server. In a scene associated with a remote computer, the remote computer may be connected to the user computer via any kind of network (including a local area network (LAN) or a wide area network (WAN), or may be connected to the external computer (for example, connected via the Internet through an Internet Service Provider).

The flow diagrams and block diagrams in the drawings illustrate system architectures, functions, and operations possibly implemented by the system, method, and computer program product of various embodiments of the present disclosure. At this point, each block in the flow diagrams or block diagrams may represent a module, a program segment, or part of codes, wherein the module, program segment, or part of codes contain one or more executable instructions for implementing a prescribed logic function. It should also be noted that in some alternative implementations, the functions annotated in the blocks may also occur in a sequence different from what is indicated in the drawings. For example, two successively expressed blocks actually may be executed substantially in parallel, and they may be sometimes executed in a reverse order, dependent on the functions involved. It should also be noted that each block in the block diagrams and/or flow diagrams and a combination of blocks in the block diagrams and/or flow diagrams may be implemented by a specific hardware-based system for executing a prescribed function or operation, or may be implemented by a combination of specific hardware and computer instructions.

The units mentioned in the description of the embodiments of the present disclosure may be implemented in a software manner or in a hardware manner. The described units may be disposed in a processor, for example may be described as: a processor comprising a sending unit. Particularly, names of these units do not constitute limitations to those units. For example, the sending unit may also be described as "a unit for sending target transportation indication information". For another example, maybe described as: a processor comprising a collecting unit. Particularly, names of these units do not constitute limitations to those units. For example, the collecting unit may also be described as "a unit for collecting item(s)".

In another aspect, the present disclosure further provides a computer-readable medium; the computer-readable medium may be included in the apparatus described in the embodiments; or may be separately provided, without being installed in the apparatus. The computer-readable medium carries one or more programs that, when being executed by the apparatus, cause the apparatus to: sending target transportation indication information corresponding to a target order to a target vehicle in the at least one vehicle, wherein the target transportation indication information includes the target order and a target storage compartment identifier, the target storage compartment identifier being configured for indicating a target storage compartment in a target storage receptacle connected with the target vehicle; and wherein the target vehicle collects an item/items corresponding to the target order to the target storage compartment in response to receiving the target transportation indication information.

In another aspect, the present disclosure further provides another computer-readable medium; the computer-readable medium may be included in the apparatus described in the embodiments; or may be separately provided, without being installed in the apparatus. The computer-readable medium carries one or more programs that, when being executed by the apparatus, cause the apparatus to: collecting an item/items corresponding to a target order to a target storage compartment in response to receiving target transportation indication information sent from the control server, wherein the target transportation indication information includes the target order and a target storage compartment identifier, the target storage compartment identifier being configured for indicating the target storage compartment in a target storage receptacle connected with the vehicle.

What have been described above are only preferred embodiments of the present disclosure and an illustration of the technical principle as exerted. Those skilled in the art should understand, the scope of invention in the present disclosure is not limited to the technical solution resulting from a specific combination of the technical features, and meanwhile, should also cover other technical solutions resulting from any combination of the technical features or their equivalent features without departing from the inventive concept. For example, a technical solution resulting from mutual substitution of the features and those technical features disclosed (not limited to) in the present disclosure with similar functions.

What is claimed is:

1. A fulfillment system, comprising: a control server, at least one vehicle, and at least one storage receptacle connected with the vehicle, the storage receptacle including at least one storage compartment, wherein:

the control server is configured for sending target transportation indication information corresponding to at least one target order to a target vehicle, each of the at least one target order corresponding to at least one item, the target transportation indication information including the at least one target order and a target storage compartment identifier corresponding to each of the at least one target order, the target storage compartment identifier being configured for indicating a respective target storage compartment corresponding to the each target order in a target storage receptacle connected with the target vehicle; and the target vehicle is configured for collecting the at least one item corresponding to the each target order to the respective target storage compartment corresponding to the each target order, in response to receiving the target transportation indication information, wherein each storage compartment in the target storage receptacle is provided in association with an indicator light and/or a door, and the target vehicle is electrically connected with the target storage receptacle; and wherein:

the target vehicle is configured for controlling to set the indicator light provided in association with the target storage compartment to a state that indicate the storage compartment is the target storage compartment, and controlling to set the indicator light(s) provided in association with other storage compartment(s) than the target storage compartment to a state that indicate the other storage compartment(s) are not the target storage compartment; and/or the target vehicle is configured for controlling to open the door of the target storage compartment, wherein, a slope is provided at an inner side bottom portion of the each storage compartment in the target storage receptacle, a first door is provided at an outer side of the each storage compartment corresponding to a bottom portion of the slope, and a second door and/or the indicator light is provided at a side corresponding to a top portion of the slope.

2. The fulfillment system according to claim 1, wherein the fulfillment system further comprises a packaging station; and wherein:

the target vehicle is further configured for traveling to a position of the packaging station in response to determining that at least one packaging condition in a group of preset packaging conditions is satisfied.

3. The fulfillment system according to claim 2, wherein the target vehicle is also configured for:

after traveling to the position of the packaging station, sending the target order to the packaging station, and sending the target storage compartment identifier to the packaging station or presenting the target storage compartment indication information, wherein the target storage compartment indication information is configured for indicating whether each storage compartment in the target receptacle is the target storage compartment; and the packaging station is configured for packaging the item/items in the target storage compartment according to the target order.

4. The fulfillment system according to claim 3, wherein the fulfillment system further comprises a storage receptacle holding area; and wherein:

the target vehicle is further configured for after sending the target storage compartment identifier to the packaging station, disconnecting with the target storage receptacle, traveling to the storage receptacle holding area, and connecting with a storage receptacle held in the storage receptacle holding area.

5. The fulfillment system according to claim 4, wherein the target vehicle is configured for:

in response to receiving the target transportation indication information, for each of the items corresponding to the each target order, traveling to a position of the item, and collecting the item to the respective target storage compartment corresponding to the each target order.

6. The fulfillment system according to claim 5, wherein the fulfillment system further comprises at least one retrieval information receiving device; and wherein:

the target vehicle is configured for presenting retrieval information corresponding to the item, which retrieval information includes an item identifier and an item quantity, or sending the retrieval information corresponding to the item, to the retrieval information receiving device of a picker corresponding to the position of the item, wherein the picker corresponding to the position of the item is configured for retrieving the item according to the retrieval information corresponding to the item and putting the item into the target storage compartment.

7. The fulfillment system according to claim 6, wherein the target vehicle is further configured for:

after traveling to the position of the item and before collecting the item to the target storage compartment, sending the target storage compartment identifier to the retrieval information receiving device of the picker corresponding to the position of the item or presenting the target storage compartment indication information.

8. The fulfillment system according to claim 1, wherein the packaging station further comprises a robot arm and a packaging platform; and wherein:

the robot arm is configured for retrieving the item/items in the target storage compartment and moving the item/items retrieved from the target storage compartment to the packaging platform.

9. The fulfillment system according to claim 1, wherein the target vehicle is configured for:

after traveling to the position of the item and before collecting the item to the target storage compartment, controlling to open the second door of the target storage compartment and/or controlling to set the indicator light provided in association with the target storage compartment to a state that indicate the storage compartment is the target storage compartment; and controlling to set the indicator light(s) provided in association with other storage compartment(s) than the target storage compartment in the target storage receptacle to a state that indicate the other storage compartment(s) are not the target storage compartment.

10. The fulfillment system according to claim 9, wherein the packaging station further comprises a packaging platform; and wherein:

the target vehicle is configured for after sending the target order to the packaging station, controlling to open the first door of the target storage compartment such that the item in the target storage compartment slides off onto the packaging platform.

11. A sorting method applied to a control server in a fulfillment system, wherein the fulfillment system comprises: a control server, at least one vehicle, and at least one storage receptacle connected with the vehicle, the storage receptacle including at least one storage compartment, wherein the method comprises:

sending target transportation indication information corresponding to at least one target order to a target vehicle in the at least one vehicle, each of the at least one target order corresponding to at least one item, wherein the target transportation indication information includes the at least one target order and a target storage compartment identifier corresponding to each of the at least one target order, the target storage compartment identifier being configured for indicating a respective target storage compartment corresponding to the each target order in a target storage receptacle connected with the target vehicle; and wherein the target vehicle collects the at least one item corresponding to the target order to the target storage compartment corresponding to the each target order, in response to receiving the target transportation indication information, wherein each storage compartment in the target storage receptacle is provided in association with an indicator light and/or a door, and the target vehicle is electrically connected with the target storage receptacle; and wherein the method further comprises:

controlling to set the indicator light provided in association with the target storage compartment to a state that indicate the storage compartment is the target storage compartment, and controlling to set the indicator light(s) provided in association with other storage compartment(s) than the target storage compartment to a state that indicate the other storage compartment(s) are not the target storage compartment; and/or controlling to open the door of the target storage compartment, wherein, a slope is provided at an inner side bottom portion of the each storage compartment in the target storage receptacle, a first door is provided at an outer side of the each storage compartment corresponding to a bottom portion of the slope, and a second door and/or the indicator light is provided at a side corresponding to a top portion of the slope.

12. A sorting method applied to a vehicle in a fulfillment system, wherein the fulfillment system comprises: a control server, at least one vehicle, and at least one storage receptacle connected with the vehicle, the storage receptacle including at least one storage compartment, wherein the method comprises:

collecting at least one item corresponding to each of at least one target order to a target storage compartment corresponding to the each target order in response to receiving target transportation indication information sent from the control server, wherein the target transportation indication information includes the at least one target order and a target storage compartment identifier corresponding to each of the at least one target order, the target storage compartment identifier being configured for indicating the respective target storage compartment corresponding to the each target order in a target storage receptacle connected with the vehicle, wherein each storage compartment in the target storage receptacle is provided in association with an indicator light and/or a door, and the target vehicle is electrically connected with the target storage receptacle; and wherein the method further comprises:

controlling to set the indicator light provided in association with the target storage compartment to a state that indicate the storage compartment is the target storage compartment, and controlling to set the indicator light(s) provided in association with other storage compartment(s) than the target storage compartment to a state that indicate the other storage compartment(s) are not the target storage compartment; and/or controlling to open the door of the target storage compartment, wherein a slope is provided at an inner side bottom portion of the each storage compartment in the target storage receptacle, a first door is provided at an outer side of the each storage compartment corresponding to a bottom portion of the slope, and a second door and/or the indicator light is provided at a side corresponding to a top portion of the slope.

13. The method according to claim 12, wherein the fulfillment system further comprises a packaging station; and wherein:

the method further comprises:
traveling to a position of the packaging station in response to determining that at least one packaging condition in a group of preset packaging conditions is satisfied.

14. The method according to claim 13, further comprising, after traveling to the position of the packaging station, sending the target order to the packaging station, and sending the target storage compartment identifier to the packaging station or presenting the target storage compartment indication information, wherein the target storage compartment indication information is configured for indicating whether each storage compartment in the target receptacle is the target storage compartment; and wherein the packaging station packages the item/items in the target storage compartment according to the target order.

15. The method according to claim 14, wherein the fulfillment system further comprises a storage receptacle holding area; and further comprising, after sending the target storage compartment identifier to the packaging station:

disconnecting with the target storage receptacle, traveling to the storage receptacle holding area, and connecting with a storage receptacle held in the storage receptacle holding area.

16. The method according to claim 15, wherein collecting at least one item corresponding to each of at least one target order to a target storage compartment corresponding to the each target order in response to receiving target transportation indication information sent from the control server comprises:

in response to receiving the target transportation indication information sent from the control server, for each of the items corresponding to the each target order, traveling to a position of the item, and collecting the item to the respective target storage compartment corresponding to the each target order.

17. The method according to claim 16, wherein the fulfillment system further comprises at least one retrieval information receiving device; and wherein:

collecting the item to the target storage compartment comprises:
presenting retrieval information corresponding to the item, which retrieval information includes an item identifier and an item quantity, or sending the retrieval information corresponding to the item, to the retrieval information receiving device of a picker corresponding to the position of the item, wherein the picker corresponding to the position of the item picks the item according to the retrieval information corresponding to the item and puts the item into the target storage compartment.

18. The method according to claim 17, further comprising, after traveling to the position of the item and before collecting the item to the target storage compartment:

sending the target storage compartment identifier to the retrieval information receiving device of the picker corresponding to the position of the item or presenting the target storage compartment indication information.

19. The method according to claim 12, wherein the packaging station further comprises a robot arm and a packaging platform; and wherein:

the packaging station packaging the item/items in the target storage compartment according to the target order comprises:
the robot arm retrieving the item/items in the target storage compartment and moving the item/items retrieved from the target storage compartment to the packaging platform.

20. The method according to claim 12, wherein after traveling to the position of the item and before collecting the item to the target storage compartment, presenting the target storage compartment indication information comprises:
controlling to open the second door of the target storage compartment and/or controlling to set the indicator light provided in association with the target storage compartment to a state that indicate the storage compartment is the target storage compartment; and controlling to set the indicator light(s) provided in association with other storage compartment(s) than the target storage compartment in the target storage receptacle to a state that indicate the other storage compartment(s) are not the target storage compartment.

21. The method according to claim 20, wherein the packaging station further comprises a packaging platform; and wherein:
presenting the target storage compartment indication information after sending the target order to the packaging station comprises:
controlling to open the first door of the target storage compartment such that the item in the target storage compartment slides off onto the packaging platform.

22. A control server, comprising:
an interface;
a memory on which a computer program is stored; and
one or more processors operably coupled to the interface and the memory, wherein the one or more processors function to:
send target transportation indication information corresponding to at least one target order to a target vehicle in the at least one vehicle, each of the at least one target order corresponding to at least one item, wherein the target transportation indication information includes the at least one target order and a target storage compartment identifier corresponding to each of the at least one target order, the target storage compartment identifier being configured for indicating a respective target storage compartment corresponding to the each target order in a target storage receptacle connected with the target vehicle; and wherein the target vehicle collects the at least one item corresponding to the target order to the target storage compartment corresponding to the each target order in response to receiving the target transportation indication information, wherein each storage compartment in the target storage receptacle is provided in association with an indicator light and/or a door, and the target vehicle is electrically connected with the target storage receptacle; and wherein:
the target vehicle is configured for controlling to set the indicator light provided in association with the target storage compartment to a state that indicate the storage compartment is the target storage compartment, and controlling to set the indicator light(s) provided in association with other storage compartment(s) than the target storage compartment to a state that indicate the other storage compartment(s) are not the target storage compartment; and/or
the target vehicle is configured for controlling to open the door of the target storage compartment, wherein, a slope is provided at an inner side bottom portion of the each storage compartment in the target storage receptacle, a first door is provided at an outer side of the each storage compartment corresponding to a bottom portion of the slope, and a second door and/or the indicator light is provided at a side corresponding to a top portion of the slope.

23. A computer-readable storage medium on which a computer program is stored, wherein the computer program, when being executed by or more processors, cause the one or more processors to:
send target transportation indication information corresponding to at least one target order to a target vehicle in the at least one vehicle, each of the at least one target order corresponding to at least one item, wherein the target transportation indication information includes the at least one target order and a target storage compartment identifier corresponding to each of the at least one target order, the target storage compartment identifier being configured for indicating a respective target storage compartment corresponding to the each target order in a target storage receptacle connected with the target vehicle; and wherein the target vehicle collects the at least one item corresponding to the target order to the target storage compartment corresponding to the each target order, in response to receiving the target transportation indication information, wherein each storage compartment in the target storage receptacle is provided in association with an indicator light and/or a door, and the target vehicle is electrically connected with the target storage receptacle; and wherein:
the target vehicle is configured for controlling to set the indicator light provided in association with the target storage compartment to a state that indicate the storage compartment is the target storage compartment, and controlling to set the indicator light(s) provided in association with other storage compartment(s) than the target storage compartment to a state that indicate the other storage compartment(s) are not the target storage compartment; and/or
the target vehicle is configured for controlling to open the door of the target storage compartment, wherein, a slope is provided at an inner side bottom portion of the each storage compartment in the target storage receptacle, a first door is provided at an outer side of the each storage compartment corresponding to a bottom portion of the slope, and a second door and/or the indicator light is provided at a side corresponding to a top portion of the slope.

24. A vehicle, comprising:
a moving apparatus;
a carrying apparatus; and
a control apparatus operably coupled to the moving apparatus, wherein the control apparatus comprises an interface, a memory on which a computer program is stored, and one or more processors operably coupled to the interface and the memory, wherein the one or more processors function to:
collect at least one item corresponding to each of at least one target order to a target storage compartment corresponding to the each target order in response to receiving target transportation indication information sent from the control server, wherein the target transportation indication information includes the at least one target order and a target storage compartment identifier corresponding to each of the at least one target order, the target storage compartment identifier being configured for indicating the respective target storage compartment corresponding to the each target order in a target storage receptacle connected with the vehicle, wherein each storage compartment in the target storage receptacle is provided in association with an indicator light and/or a door, and the vehicle is electrically connected, with the target storage receptacle; and wherein the one or more processors further function to:

control to set the indicator light provided in association with the target storage compartment to a state that indicate the storage compartment is the target storage compartment, and controlling to set the indicator light(s) provided in association with other storage compartment(s) than the target storage compartment to a state that indicate the other storage compartment(s) are not the target storage compartment; and/or control to open the door of the target storage compartment, wherein, a slope is provided at an inner side bottom portion of the each storage compartment in the target storage receptacle, a first door is provided at an outer side of the each storage compartment corresponding to a bottom portion of the slope, and a second door and/or the indicator light is provided at a side corresponding to a top portion of the slope.

25. A computer-readable storage medium on which a computer program is stored, wherein the computer program, when being executed by or more processors, cause the one or more processors to: collect at least one item corresponding to each of at least one target order to a target storage compartment corresponding to the each target order in response to receiving target transportation indication information sent from the control server, wherein the target transportation indication information includes the at least one target order and a target storage compartment identifier corresponding to each of the at least one target order, the target storage compartment identifier being configured for indicating the respective target storage compartment corresponding to the each target order in a target storage receptacle connected with the vehicle, wherein each storage compartment in the target storage receptacle is provided in association with an indicator light and/or a door, and the target vehicle is electrically connected with the target storage receptacle; and wherein the one or more processors is further caused to:

control to set the indicator light provided in association with the target storage compartment to a state that indicate the storage compartment is the target storage compartment, and controlling to set the indicator light(s) provided in association with other storage compartment(s) than the target storage compartment to a state that indicate the other storage compartment(s) are not the target storage compartment; and or control to open the door of the target storage compartment, wherein a slope is provided at an inner side bottom portion of the each storage compartment in the target storage receptacle, a first door is provided at an outer side of the each storage compartment corresponding to a bottom portion of the slope, and a second door and/or the indicator light is provided at a side corresponding to a top portion of the slope.

* * * * *